United States Patent
Aoki et al.

(10) Patent No.: US 8,964,098 B2
(45) Date of Patent: Feb. 24, 2015

(54) IMAGING DEVICE AND FOCUS CONTROL METHOD HAVING FIRST AND SECOND CORRELATION COMPUTATIONS

(71) Applicant: Fujifilm Corporation, Tokyo (JP)

(72) Inventors: Takashi Aoki, Saitama (JP); Tomoki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/323,822

(22) Filed: Jul. 3, 2014

(65) Prior Publication Data

US 2014/0320709 A1 Oct. 30, 2014

Related U.S. Application Data

(63) Continuation of application No. 13/974,928, filed on Aug. 23, 2013, now abandoned, which is a continuation of application No. PCT/JP2012/056024, filed on Mar. 8, 2012.

(30) Foreign Application Priority Data

Mar. 31, 2011 (JP) ................................ 2011-080033

(51) Int. Cl.
*H04N 5/232* (2006.01)
*H04N 5/353* (2011.01)

(52) U.S. Cl.
CPC ......... *H04N 5/23212* (2013.01); *H04N 5/3532* (2013.01)
USPC ............ 348/345; 348/273; 348/294; 348/340

(58) Field of Classification Search
USPC .................. 348/273, 294, 340, 345
See application file for complete search history.

(56) References Cited

U.S. PATENT DOCUMENTS 8,704,940 B2 * 4/2014 Aoki et al. ................... 348/345
2008/0074534 A1 3/2008 Kusaka
(Continued)

FOREIGN PATENT DOCUMENTS

JP 2008-072470 A 3/2008
JP 2008-263352 A 10/2008
(Continued)

OTHER PUBLICATIONS

International Search Report for PCT/JP2012/056024 dated Jun. 12, 2012.
Written Opinion of the International Searching Authority for PCT/JP2012/056024 dated Jun. 12, 2012.

*Primary Examiner* — Usman Khan
(74) *Attorney, Agent, or Firm* — Birch, Stewart, Kolasch & Birch, LLP

(57) ABSTRACT

Provides an imaging device including, imaging element in which plural first lines arrayed with first phase difference detection pixels, and plural second lines arrayed with second phase difference detection pixels, are arrayed alternately; reading out section read out signals of the phase difference detection pixels; first correlation computing section carry out first correlation computation on signals read out from a set of the first and the second phase difference detection pixel; second correlation computing section carry out second correlation computation on signals read out from at least one set among a set of plural first phase difference detection pixels of the first line, and a set of plural second phase difference detection pixels of the second line; correcting section corrects results of the first correlation computation, by results of the second correlation computation; and focusing section control focusing based on the corrected correlation computation.

8 Claims, 19 Drawing Sheets

(56) References Cited

U.S. PATENT DOCUMENTS

| | | |
|---|---|---|
| 2008/0118238 A1 | 5/2008 | Sogawa et al. |
| 2008/0291311 A1 | 11/2008 | Kusaka |
| 2011/0096211 A1 | 4/2011 | Oikawa et al. |
| 2011/0096212 A1 | 4/2011 | Oikawa |

FOREIGN PATENT DOCUMENTS

| | | |
|---|---|---|
| JP | 2009-128579 A | 6/2009 |
| JP | 2010-008443 A | 1/2010 |
| JP | 2010-091991 A | 4/2010 |

* cited by examiner

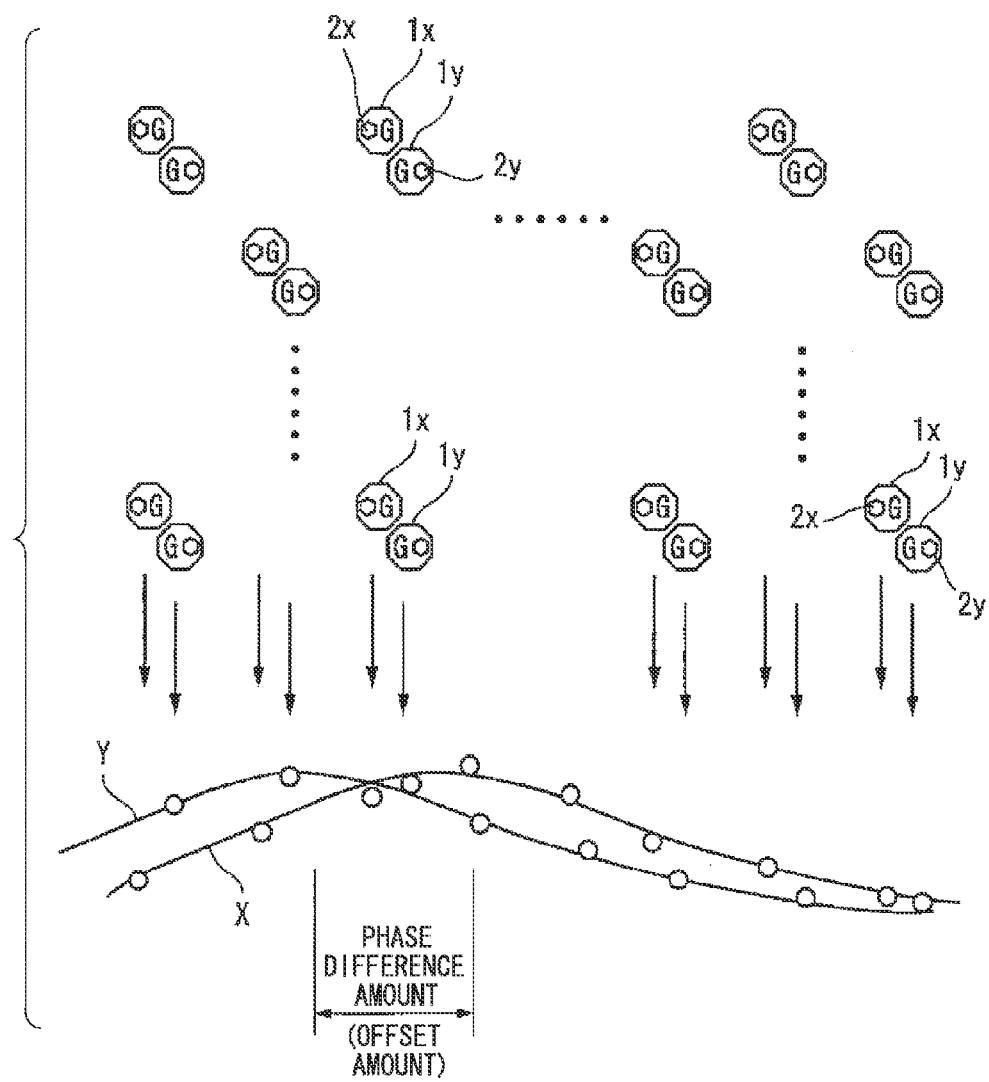

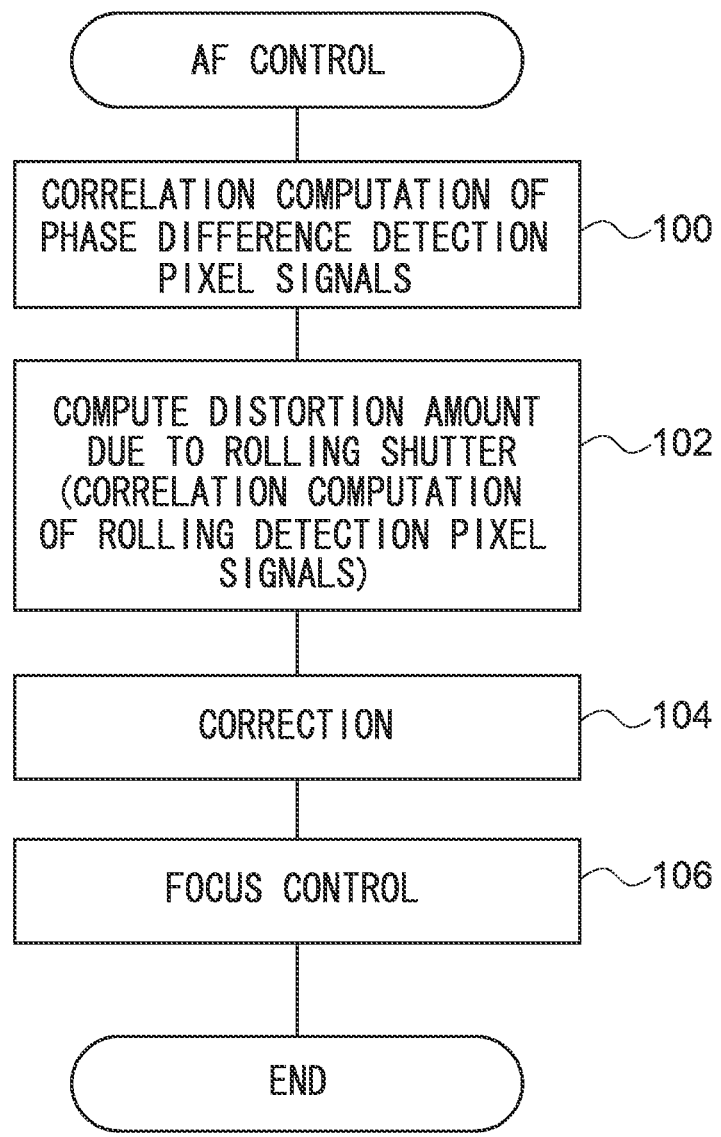

IMAGING DEVICE AND FOCUS CONTROL METHOD HAVING FIRST AND SECOND CORRELATION COMPUTATIONS

CROSS-REFERENCE TO RELATED APPLICATIONS

This application is a Continuation of copending application Ser. No. 13/974,928, filed on Aug. 23, 2013, which is a Continuation of PCT International Application No. PCT/JP2012/056024, filed on Mar. 8, 2012, which claims priority from Japanese Patent Application No. 2011-080033, filed on Mar. 31, 2011, all of which are hereby expressly incorporated by reference into the present application.

BACKGROUND OF THE INVENTION

1. Field of the Invention

The present invention relates to an imaging device and a focus control method thereof. In particular, the present invention relates to an imaging device and a focus control method thereof that carry out focus control at the time of imaging an imaged subject.

2. Description of the Related Art

In recent years, accompanying the increasing of the resolutions of solid-state imaging elements such as CCD (Charge Coupled Device) area sensors, CMOS (Complementary Metal Oxide Semiconductor) image sensors and the like, the demand for information devices having an imaging function, such as digital electronic still cameras, digital video cameras, cell phones, PDAs (Personal Digital Assistants, portable information terminals) and the like, has increased rapidly. Note that information devices having an imaging function such as described above are called imaging devices.

By the way, focus control methods that detect the distance to a main imaged subject include the contrast method and the phase difference AF (Auto Focus, automatic focus) method. The phase difference AF method may carry out detection of the focus position at high speed and with high accuracy, as compared with the contrast method, and therefore, is often employed in various imaging devices.

Note that it is known that the method of reading out in an imaging device that uses a CMOS is the rolling shutter method that carries out successive resetting and successive reading out from the top. In the rolling shutter method, because there is a time difference in the reading out timing in accordance with the pixel position, distortion arises in the image of the imaged subject in cases of an imaged subject that moves.

Accordingly, when imaging an imaged subject that moves by an imaging device that uses a CMOS, when it is made to carry out focus control by the phase difference AF method, the focus control is affected by the distortion due to the rolling shutter, and errors in phase difference detection arise due to image movement or image variations that arise during the lag in the read out timings.

Japanese Patent Application Laid-Open No. 2009-128579 discloses a device that, when reliable focal point detection results are not obtained at focal point detection pixels that are disposed in the horizontal direction, carries out focal point detection at focal point detection pixels that are disposed in the vertical direction, and, when movement of the imaged subject is detected, does not carry out focal point detection at focal point detection pixels that are disposed in the vertical direction.

Further, Japanese Patent Application Laid-Open No. 2008-72470 and Japanese Patent Application Laid-Open No. 2008-263352 disclose devices that controls such that charge accumulating timings of pixels for phase difference detection become the same.

However, in the technique disclosed in aforementioned Application Laid-Open No. 2009-128579, merely focal point detection by the phase difference AF method is carried out only under limited conditions, such as in accordance with the reliability of the focal point detection results or in a case in which movement of the imaged subject is not detected or the like, and, when focal point detection is carried out by the phase difference AF method, effects due to the rolling shutter cannot be reduced. Further, in the techniques disclosed in Japanese Patent Application Laid-Open No. 2008-72470 and Japanese Patent Application Laid-Open No. 2008-263352, costs are high because additional circuits are required.

The present invention provides an imaging device and a focus control method thereof that, even when carrying out detection of the focus position from signals read out from phase difference detection pixels that are disposed on different lines by the rolling shutter method, may reduce effects of distortion due to the rolling shutter while detecting the focus position, and may carry out focus control highly accurately, without providing additional circuits.

SUMMARY OF THE INVENTION

A first aspect of the present invention is an imaging device including: an imaging element in which a plurality of first lines, at which are arrayed first phase difference detection pixels on which is incident a light beam that has passed through one side with respect to a main axis of an imaging lens, and a plurality of second lines, at which are arrayed second phase difference detection pixels on which is incident a light beam that has passed through another side with respect to the main axis of the imaging lens, are arrayed alternately; a reading out section that reads out, from the imaging element and by a rolling shutter method, signals of phase difference detection pixels that are arrayed at the imaging element; a first correlation computing section that carries out correlation computation on signals that are read out from a set formed from the first phase difference detection pixels and the second phase difference detection pixels; a second correlation computing section that carries out correlation computation on signals that are read out from at least one set of a set formed from a plurality of first phase difference detection pixels that are disposed on the first line, or a set formed from a plurality of second phase difference detection pixels that are disposed on the second line; a correcting section that corrects results of a correlation computation obtained by the first correlation computing section, using results of a correlation computation obtained by the second correlation computing section; and a focusing section that carries out focus control by using the results of correlation computation that have been corrected.

In this way, in the first aspect of the present invention, correlation computation of signals read out from at least one set among a set, that is formed from plural first phase difference detection pixels that are disposed on the first line, and a set, that is formed from plural second phase difference detection pixels that are disposed on the second line, i.e., correlation computation of respective signals of a set of phase difference detection pixels, on which is incident a light beam that has passed through the same side with respect to the main axis of the imaging lens, is carried out. Due thereto, the first aspect of the present invention may determine only the amount of distortion due to the rolling shutter. Due thereto, in the first aspect of the present invention, the correlation computation results, that are read out from a set formed from a first phase difference detection pixel and a second phase difference detection pixel, are corrected. Therefore, the effects of distortion due to the rolling shutter may be reduced while detecting the focus position, and focus control may be carried out highly accurately.

In a second aspect of the present invention, in the first aspect, the second correlation computing section may carry out correlation computation on a plurality of sets, and the correcting section may correct the results of correlation computation obtained by the first correlation computing section, using an average value of results of correlation computation of a plurality of sets obtained by the second correlation computing section.

In a third aspect of the present invention, in the above-described aspects, in a case in which the second correlation computing section carries out correlation computation on signals read out from a set that is configured by four or more phase difference detection pixels, the second correlation computing section may divide the four or more phase difference detection pixels into two groups, and carry out correlation computation on an addition signal that is obtained by adding detection signals of one group, and an addition signal that is obtained by adding detection signals of another group.

In a fourth aspect of the present invention, in the above-described aspects, may further include: a comparing section that, in a case in which results of correlation computation of each of a plurality of sets is obtained by the second correlation computing section, compares the results of correlation computation of each of the plurality of sets with one another; and a control section that, in a case in which results of correlation computation that differ by greater than or equal to a predetermined threshold value exist according to the comparing section, controls such that focus control is cancelled, or controls such that, after cancelling of focus control, read out by the reading section is carried out again and focus control is carried out.

In a fifth aspect of the present invention, in the above-described aspects, the second correlation computing section may carry out correlation computation on signals that are read out from a set of phase difference detection pixels at which are provided color filters of a same color as a color of color filters that are provided at phase difference detection pixels of a set formed from the first phase difference detection pixel and the second phase difference detection pixel.

In a sixth aspect of the present invention, in the first through the fourth aspects, correlation computation may be carried out on signals that are read out from a set that includes a set of phase difference detection pixels at which are provided color filters of a color different than a color of color filters that are provided at phase difference detection pixels of a set formed from the first phase difference detection pixel and the second phase difference detection pixel.

In accordance with a seventh aspect of the present invention, the above-described aspect may further include: a determining section that determines whether or not correction by the correcting section is to be carried out, on the basis of at least one of a size of a focal point region in which a focal point is adjusted, a number of phase difference detection pixels from which are read out signals that are used in correlation computation by the first correlation computing section, movement of an imaged subject within an imaging angle of view, and movement of an imaged subject within the focal point region, wherein, in a case in which it is determined by the determining section that correction by the correcting section is not to be carried out, the focusing section may cancel execution of correction by the correcting section, and may carry out focus control by using results of correlation computation of the first correlation computing section before being corrected.

An eighth aspect of the present invention is a focus control method that is carried out at an imaging device having an imaging element in which a plurality of first lines, at which are arrayed first phase difference detection pixels on which is incident a light beam that has passed through one side with respect to a main axis of an imaging lens, and a plurality of second lines, at which are arrayed second phase difference detection pixels on which is incident a light beam that has passed through another side with respect to the main axis of the imaging lens, are arrayed alternately, the method including: reading out, from the imaging element and by a rolling shutter method, signals of phase difference detection pixels that are arrayed at the imaging element; carrying out first correlation computation on signals that are read out from a set formed from the first phase difference detection pixel and the second phase difference detection pixel; carrying out second correlation computation on signals that are read out from at least one set of a set formed from a plurality of first phase difference detection pixels that are disposed on the first line, or a set formed from a plurality of second phase difference detection pixels that are disposed on the second line; correcting results of the first correlation computation, using results of the second correlation computation; and carrying out controlling focus by using the results of correlation computation that have been corrected.

In this way, in accordance with the above-described aspect, it is possible to determine only the amount of distortion due to the rolling shutter by carrying out correlation computation of signals read out from at least one set among a set, that is formed from plural first phase difference detection pixels that are disposed on the first line, and a set, that is formed from plural second phase difference detection pixels that are disposed on the second line, i.e., correlation computation of respective signals of a set of phase difference detection pixels on which a light beam, that has passed through the same side with respect to the main axis of the imaging lens, is incident. Due thereto, in the above-described aspect, the correlation computation results, that are read out from a set formed from a first phase difference detection pixel and a second phase difference detection pixel, are corrected. Therefore, the effects of distortion due to the rolling shutter may be reduced while detecting the focus position, and focus control may be carried out highly accurately.

In accordance with the above-described aspects of the present invention, the effects of distortion due to the rolling shutter may be reduced while detecting the focus position, and focus control may be carried out highly accurately, without providing additional circuits.

BRIEF DESCRIPTION OF DRAWINGS

Detailed explanation follows regarding exemplary embodiments of the present invention, with reference to the following drawings.

FIG. 4 is a drawing schematically showing only phase difference detection pixels that are used in phase difference detection.

FIG. 6 is a flowchart showing the flow of AF control relating to a first exemplary embodiment.

DETAILED DESCRIPTION OF THE INVENTION

Exemplary embodiments of the present invention are described in detail hereinafter with reference to the drawings. Note that, here, description is given of a case in which the present invention is applied to a digital electronic still camera (hereinafter called "digital camera") that carries out imaging of still images.

First Exemplary Embodiment

First, the configure of main portions of the electrical system of a digital camera 10 relating to the present exemplary embodiment is described with reference to FIG. 1.

Figure 1:
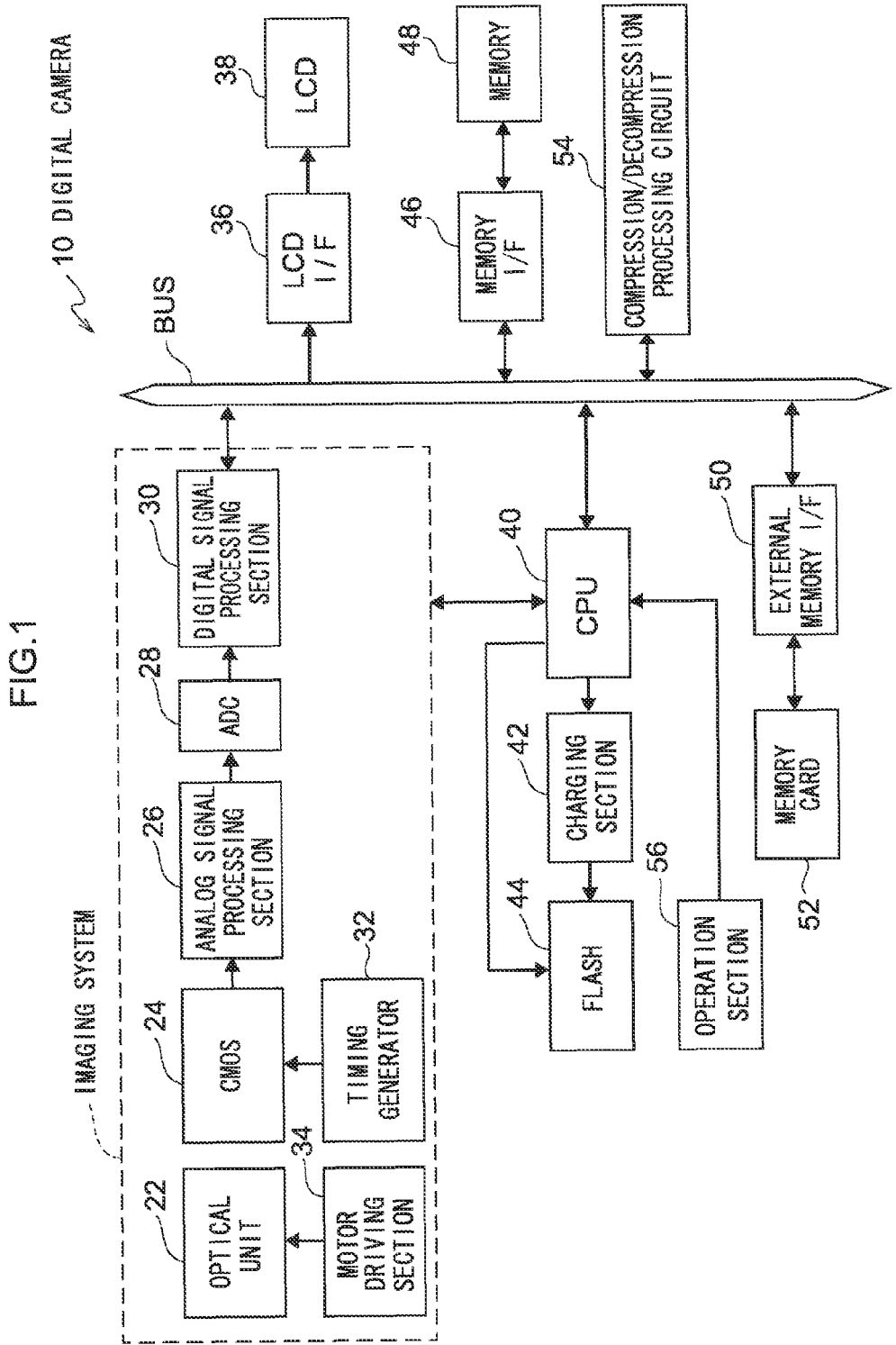
FIG. 1 is a block diagram showing the configuration of main portions of the electrical system of a digital camera relating to exemplary embodiments of the present invention.

As shown in FIG. 1, the digital camera 10 relating to the present exemplary embodiment is configured to include an optical unit 22, a solid-state imaging element 24, and an analog signal processing section 26. The optical unit 22 is configured to include a lens for focusing the image of the imaged subject. The solid-state imaging element (which is made to be a CMOS (Complementary Metal Oxide Semiconductor) in the present exemplary embodiment) 24 is disposed at the rear of the optical axis of this lens. The analog signal processing section 26 carries out various types of analog signal processing on inputted analog signals.

Further, the digital camera 10 is configured to include an analog/digital converter (hereinafter called "ADC") 28 that converts inputted analog signals into digital data, and a digital signal processing section 30 that carries out various types of digital signal processing on inputted digital data.

Note that the digital signal processing section 30 incorporates therein a line buffer of a predetermined capacity, and also carries out control for directly storing inputted digital data in a predetermined region of a memory 48 that is described later.

The output end of the CMOS 24 is connected to the input end of the analog signal processing section 26. Further, the output end of the analog signal processing section 26 is connected to the input end of the ADC 28. Moreover, the output end of the ADC 28 is connected to the input end of the digital signal processing section 30. Accordingly, analog signals, that express the image of the imaged subject and that are outputted from the CMOS 24, are subjected to predetermined analog signal processings by the analog signal processing section 26, and are converted into digital image data by the ADC 28, and thereafter, are inputted to the digital signal processing section 30.

On the other hand, the digital camera 10 is configured to include a liquid crystal display (hereinafter called "LCD") 38, an LCD interface 36, a CPU (Central Processing Unit) 40, the memory 48, and a memory interface 46. The liquid crystal display (hereinafter called "LCD") 38 displays the imaged image of the imaged subject and menu screens and the like. The LCD interface 36 generates signals for causing the LCD 38 to display the image of the imaged subject or the menu screens or the like, and supplies the signals to the LCD 38. The CPU (Central Processing Unit) 40 governs the overall operations of the digital camera 10. The memory 48 temporarily stores digital image data obtained by imaging, and the like. The memory interface 46 controls access to the memory 48.

Moreover, the digital camera 10 is configured to include an external memory interface 50 for enabling a portable memory card 52 to be accessed at the digital camera 10, and a compression/decompression processing circuit 54 that carries out compression processing and decompression processing on digital image data.

Note that, at the digital camera 10 of the present exemplary embodiment, a Flash Memory is used as the memory 48, and an xD Picture Card (registered trademark) is used as the memory card 52. However, the memory 48 is not limited to this.

The digital signal processing section 30, the LCD interface 36, the CPU 40, the memory interface 46, the external memory interface 50, and the compression/decompression processing circuit 54 are connected to one another via a system bus BUS. Accordingly, the CPU 40 can carry out control of the operations of the digital signal processing section 30 and the compression/decompression processing circuit 54, and display of various types of information on the LCD 38 via the LCD interface 36, and access to the memory 48 and the memory card 52 via the memory interface 46 and the external memory interface 50.

On the other hand, a timing generator 32, that mainly generates timing signals (pulse signals) for driving the CMOS 24 and supplies the signals to the CMOS 24, is provided at the digital camera 10. The driving of the CMOS 24 is controlled by the CPU 40 via the timing generator 32.

Note that the CMOS 24 has plural lines in which plural pixels are arrayed in the horizontal direction as will be described later, and is controlled by the rolling shutter method that controls the exposure start timings and the read out timings per the pixels on a line. Note that, hereinafter, description is given by using, as an example, a case in which the exposure start and read out timings differ per line, but the present invention is not limited thereto.

Moreover, a motor driving section 34 is provided at the digital camera 10. The driving of an unillustrated focal point adjusting motor, zoom motor and diaphragm driving motor that are provided at the optical unit 22 also are controlled by the CPU 40 via the motor driving section 34.

Namely, the aforementioned lens relating to the present exemplary embodiment has an imaging lens having a zoom lens and a focus lens, and has an unillustrated lens driving mechanism. This lens driving mechanism includes the aforementioned focal point adjusting motor, zoom motor and diaphragm driving motor, and these motors are respectively driven by driving signals supplied from the motor driving section 34 due to control of the CPU 40.

Moreover, the digital camera 10 is provided with operation section 56 that are configured to include various types of switches such as a release switch (a so-called shutter), a power switch, a mode switching switch, a menu switch, an OK switch, a cancel switch, and the like. The release switch (a so-called shutter) is push-operated at the time of executing imaging. The power switch is operated at the time of switching the on/off state of the power source of the digital camera 10. The mode switching switch is operated at the time of setting the mode to either of an imaging mode, that is a mode that carries out imaging, and a playback mode, that is a mode that plays back the image of the imaged subject on the LCD 38. The menu switch is push-operated when making the LCD 38 display menu screens. The OK switch is push-operated when confirming the contents of operation up until then. The cancel switch is push-operated when cancelling the contents of operation immediately therebefore. The operation section 56 is connected to the CPU 40. Accordingly, the CPU 40 can always know of the operated states of this operation section 56.

Note that the release switch of the digital camera 10 relating to the present exemplary embodiment is configured so as to be able to detect pushing operations in two states that are a state in which the release switch is pushed-down to an intermediate position (called a "halfway-depressed state" hereinafter) and a state in which the release switch is pushed-down to the final pushed-down position that is past this intermediate position (called a "fully depressed state" hereinafter).

Further, at the digital camera 10, due to the release switch being set in the halfway-depressed state, an AE (Automatic Exposure) function works and the state of exposure (the shutter speed, the state of the diaphragm) is set, and thereafter, the AF function works and the focus is controlled. In the digital camera 10, thereafter, when the release switch is set continuously in the fully depressed state, exposure (imaging) is carried out.

Further, a flash 44, that emits light to be illuminated onto the imaged subject as needed at the time of imaging, and a charging section 42, that is interposed between the flash 44 and the CPU 40 and charges electric power for causing the flash 44 to emit light due to control of the CPU 40, are provided at the digital camera 10. Moreover, the flash 44 is connected to the CPU 40 as well, and the emission of light by the flash 44 is controlled by the CPU 40.

Figure 2:
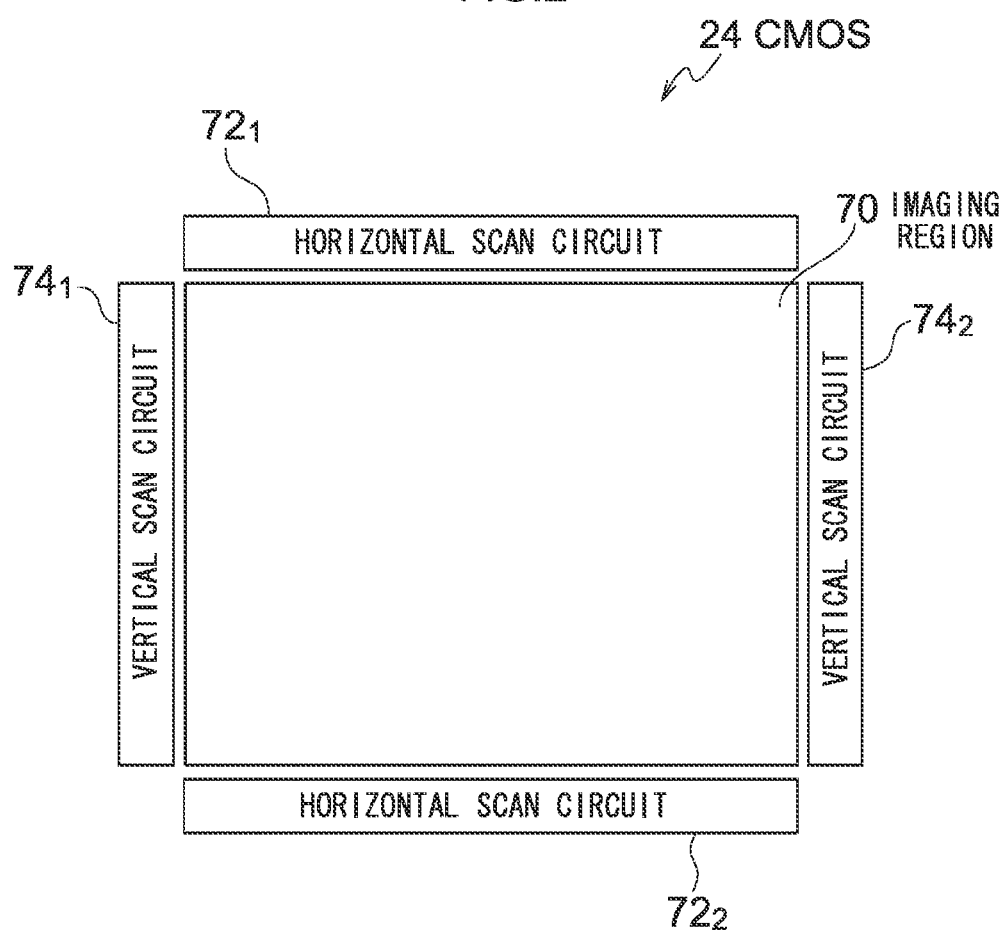
FIG. 2 is a plan view showing the overall configure of a CMOS.

FIG. 2 is a plan view showing the overall configuration of the CMOS 24. Numerous pixels (light-receiving elements: photodiodes; not illustrated) are formed so as to be arrayed in a two-dimensional array at an imaging region 70 of the CMOS 24. In this embodiment, there is a so-called honeycomb pixel array in which the even-numbered pixel rows are arrayed so as to each be offset by ½ of the pixel pitch with respect to the odd-numbered pixel rows.

Further, although not shown in FIG. 2, in the present exemplary embodiment, R (red), G (green), B (blue) color are layered in a state of being arrayed in a Bayer array at each of the plural pixels of the imaging region 70 that includes a phase difference detection region. Note that the array of RGB may be a striped array.

Horizontal scan circuits $72_1$, $72_2$, and vertical scan circuits $74_1$, $74_2$ are further provided at the CMOS 24 relating to the present exemplary embodiment. Note that, although not illustrated, horizontal signal lines are connected to the horizontal scan circuits $72_1$, $72_2$, and vertical selection lines are connected to the vertical scan circuits $74_1$, $74_2$.

The vertical scan circuit $74_1$ selects, through the vertical selection lines and in units of a row (a line), respective pixels of a first pixel group of the odd-numbered rows disposed at the imaging region 70. In this case, the pixels are selected in order line-by-line from the bottommost end, and reading out of the pixel signals is carried out collectively per line. Note that a CDS circuit, that carries out correlated double sampling processing on the respective pixel signals, that are read out in line units from the first pixel group, and reduces reset noise, may be provided. The horizontal scan circuit $72_1$ selects, successively in pixel units from the left end, the pixel signals of one row that are read out from the first pixel group. Due thereto, the respective pixel signals read out from the first pixel group are outputted to the horizontal signal lines. The pixel signals, that are successively outputted to the horizontal signal lines in this way, are amplified by latter-stage amplifiers (not shown), and thereafter, are outputted to the exterior.

Further, the vertical scan circuit $74_2$ selects, through the vertical selection lines and in units of a row, respective pixels of a second pixel group of the even-numbered rows disposed at the imaging region 70. In this case, the pixels are selected in order line-by-line from the bottommost end, and reading out of the pixel signals is carried out collectively per line. Note that a CDS circuit, that carries out correlated double sampling processing on the respective pixel signals, that are read out in line units from the second pixel group, and reduces reset noise, may be provided. The horizontal scan circuit $72_2$ selects, successively in pixel units from the left end, the pixel signals of one row that are outputted from the second pixel group. Due thereto, the respective pixel signals read out from the second pixel group are outputted to the horizontal signal lines. The pixel signals, that are successively outputted to the horizontal signal lines in this way, are amplified by latter-stage amplifiers (not shown), and thereafter, are outputted to the exterior.

Note that, in the present exemplary embodiment, a rectangular phase difference detection region is provided at a partial region, e.g., the central position, of the imaging region 70. Note that the phase difference detection region may be provided at one place with respect to the imaging region 70, or may be provided at plural places so that AF can be made possible anywhere within the imaging region 70.

Figure 3:
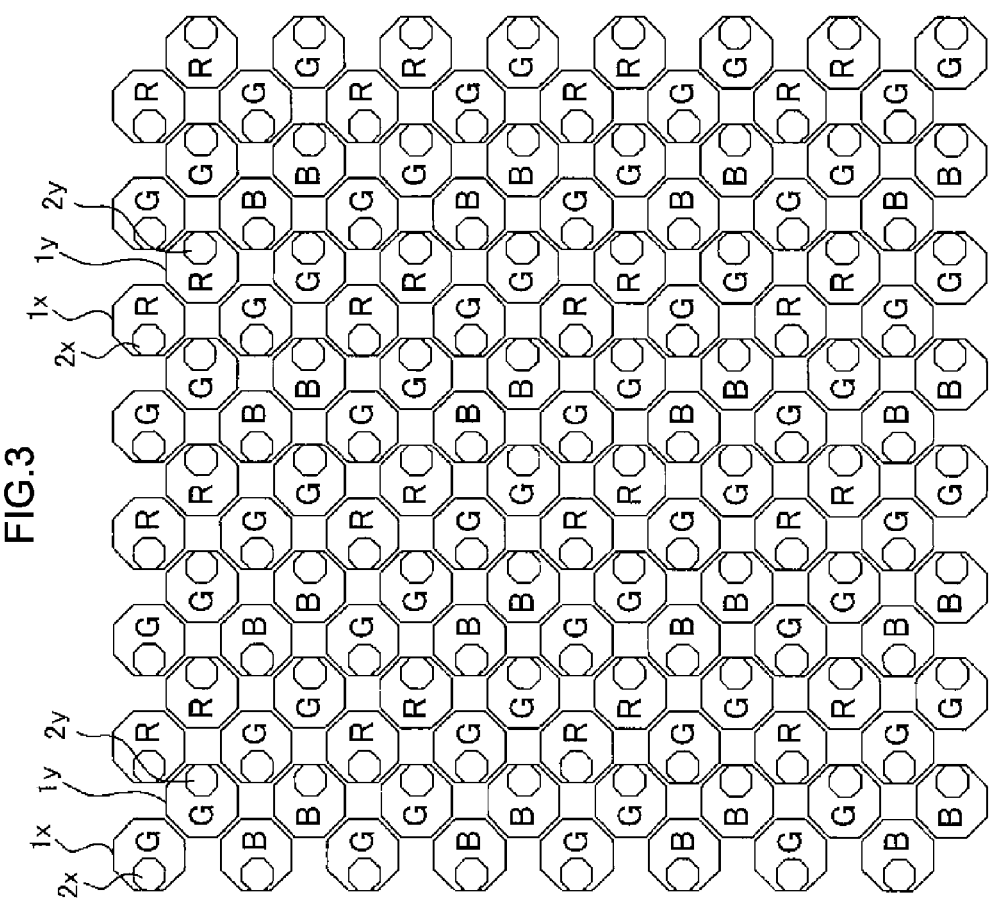
FIG. 3 is an enlarged schematic drawing of a surface of a portion within an AF region.

FIG. 3 is an enlarged schematic drawing of the surface of a portion of the interior of the phase difference detection region. FIG. 3 illustrates a state in which the lines in which phase difference detection pixels 1x are arrayed (here, the odd-numbered lines), and lines in which phase difference detection pixels 1y are arrayed (here, the even-numbered lines), are arrayed alternately. Also within the phase difference detection region, there is a so-called honeycomb array in which the even-numbered pixel rows are arrayed so as to each be offset by ½ of the pixel pitch with respect to the odd-numbered pixel rows.

Note that a state in which only the phase difference detection pixels 1x, 1y are disposed is shown in FIG. 3. However, imaging pixels (pixels other than the phase difference detection pixels 1x, 1y: regular pixels at which a light-blocking film is not provided and that are for imaging the image of the imaged subject) may be partially disposed. Further, only imaging pixels are disposed at the imaging region 70 other than the phase difference detection region (not shown).

In the illustrated example the respective pixels are shown as R (red), G (green), B (blue). R, G, B express the colors of the color filters that are layered on the respective pixels, and the color filters are Bayer-arrayed at the pixels of the odd-numbered rows, and the color filters are Bayer-arrayed at the pixels of the even-numbered rows. Due thereto, given that the two phase difference detection pixels 1x, 1y that are adjacent diagonally are one set (pair), there is a state in which a color filter of the same color is disposed at the two phase difference detection pixels 1x, 1y that are diagonally adjacent and configure a pair.

Further, light-blocking film openings 2x, 2y of the phase difference detection pixels 1x, 1y are formed to be smaller than the imaging pixels, and the light-blocking film openings 2x of the pixels 1x are provided so as to be eccentric toward the left direction, and the light-blocking film openings 2y of the pixels 1y are provided so as to be eccentric toward the right direction (the phase difference detection direction).

Due to such a configure, the light beam, that has passed through one side (here, the left side) with respect to the main axis of the imaging lens, is incident on the phase difference detection pixels 1x. Further, the phase difference detection pixels 1y are disposed on the lines adjacent to the phase difference detection pixels 1x that configure the pairs, and the light beam, that has passed through the other side (here, the right side) with respect to the main axis of the imaging lens, is incident on the phase difference detection pixels 1y. As described later, in an out-of-focus state, offset arises in the positions and phases of the images detected by the phase difference detection pixels 1x, 1y respectively, and therefore, this offset amount (phase difference amount) is detected, and focus control is carried out.

Note that there is no need to use phase difference detection pixel pairs of all colors for range finding of the imaged subject, and phase difference detection may be carried out by using only the phase difference detection pixel pairs of a specific color, or phase difference detection may be carried out by using specific phase difference detection pixel pairs among the phase difference detection pixel pairs of a specific color. Further, the phase difference detection pixels 1x, 1y may also be used in forming the image of the imaged subject.

FIG. 4 is an explanatory drawing for explaining a phase difference detection method in a case in which the phase difference detection pixels 1x, 1y, that are adjacent and at which G-color color filters are provided, are used as pairs in phase difference detection for range finding of the imaged subject. Curve X shown at the bottom of FIG. 4 is a graph that plots the detection signal amounts of the G-color phase difference detection pixels 1x that are lined-up in one lateral row. Further, curve Y is a graph that plots the detection signal amounts of the G-color phase difference detection pixels 1y that form pairs with these pixels 1x.

Because the pair of phase difference detection pixels 1x, 1y are adjacent pixels and are extremely close, it can be thought that they receive light from the same imaged subject. Therefore, if there are no effects of distortion due the rolling shutter that are described hereafter, it can be thought that curve X and curve Y have substantially the same shape, and that offset thereof in the left-right direction (the phase difference detecting direction) is the phase difference amount between the image seen at the one pixel 1x and the image seen at the other pixel 1y of the pair of phase difference detection pixels that are pupil-divided.

By carrying out correlation computation on these curve X and curve Y, the lateral offset amount (phase difference amount) can be determined, and the distance to the imaged subject can be computed from this phase difference amount. It suffices to employ a known method (e.g., the method disclosed in Japanese Patent Application Laid-Open No. 2010-8443 or the method disclosed in Japanese Patent Application Laid-Open No. 2010-91991) as the method of determining an evaluation value of the correlation amount of curve X and curve Y. For example, the integrated value of the absolute value of the difference between each point X(i) that configures curve X and each point Y(i+j) that configures curve Y is made to be the evaluation value, and the value of j that provides the maximum evaluation value is made to be the phase difference amount.

Further, on the basis of the distance to the imaged subject that is determined from this phase difference amount, the motor driving section 34 is controlled, the focal point adjusting motor of the optical unit 22 is driven, and the focus lens position is controlled so as to focus on the imaged subject.

Figure 5A:
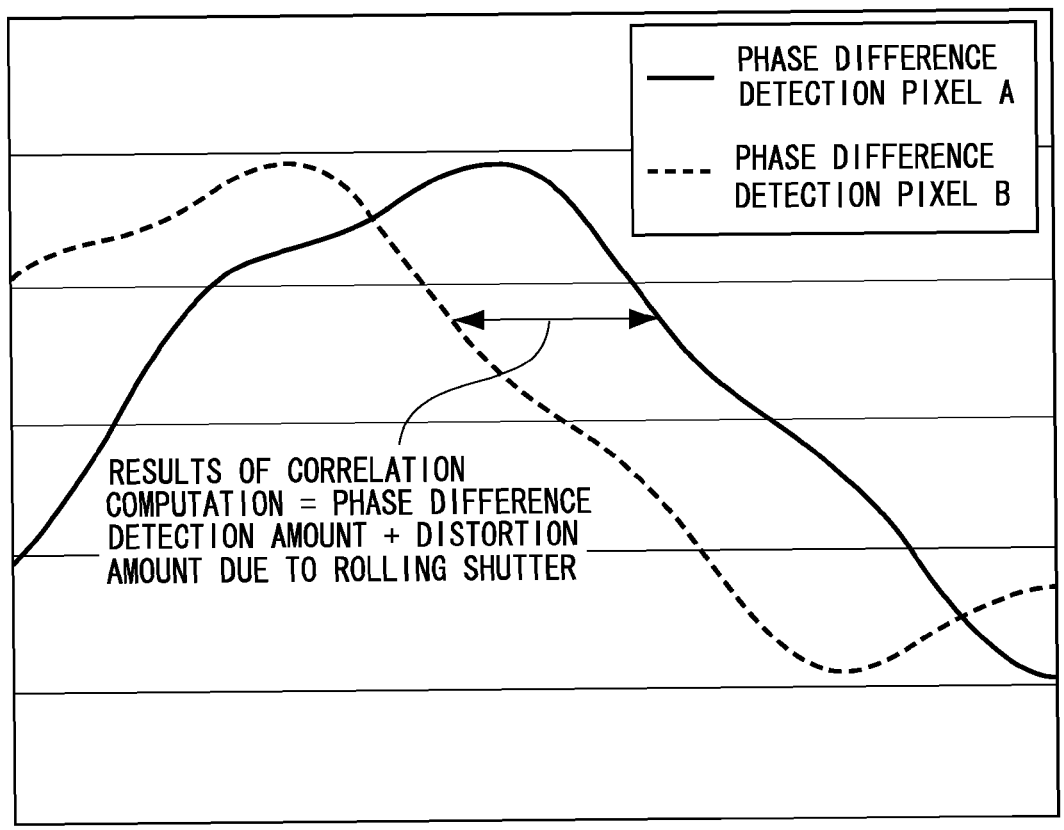
FIG. 5A is a drawing schematically showing that an offset amount, that is determined from correlation computation of detection signals read out from a pair of phase difference detection pixels, includes not only a phase difference amount, but also an error amount due to rolling distortion (a distortion amount due to the rolling shutter).

However, in the present exemplary embodiment, a CMOS that is controlled by the rolling shutter method is used as the solid-state imaging element. Accordingly, when carrying out correlation computation on the basis of detection signals that are acquired from a phase difference detection pixel pair that is formed from two phase difference detection pixels whose readout timings are not the same, if the imaged subject moves or changes during the lag in these timings, distortion arises in the image of the imaged subject that is picked-up, and the effects of distortion due to this rolling shutter (a distortion amount) arises in the phase difference amount that is determined by correlation computation (refer to FIG. 5A as well).

Figure 5B:
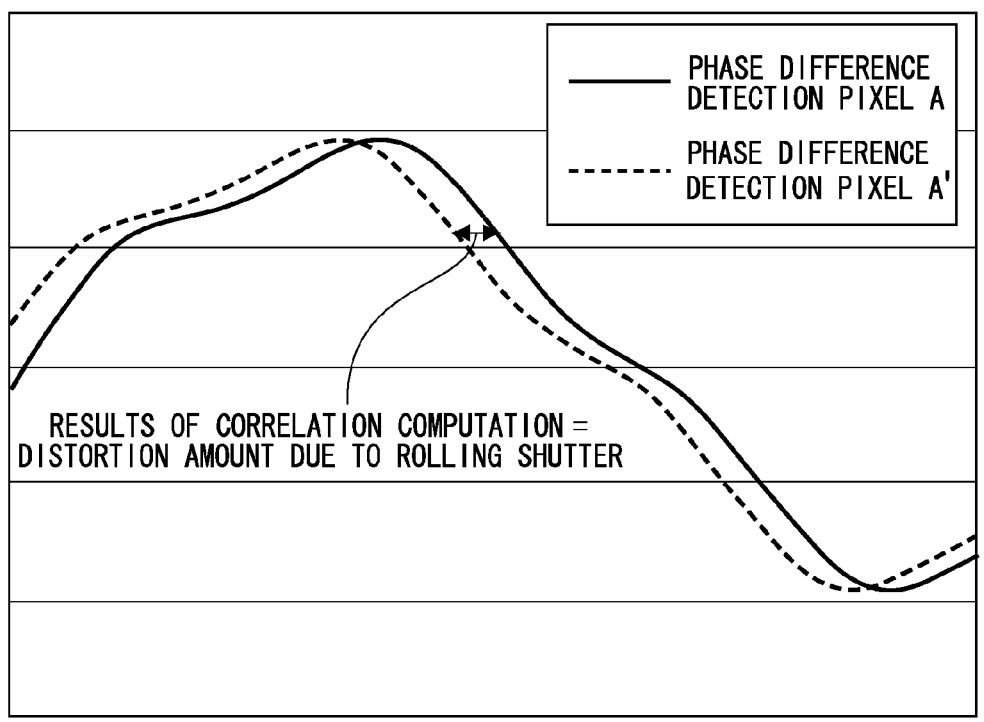
FIG. 5B is a drawing schematically showing that the distortion amount due to the rolling shutter can be computed by carrying out correlation computation based on a pair of phase difference detection pixels that are positioned the same distance from one ends of lines.

On the other hand, as shown in FIG. 5B, if, for example, two phase difference detection pixels 1x (shown as phase difference detection pixels A, A' in FIG. 5B), that have the same distance (position in the horizontal direction) from one ends of lines, are made to be one set (pair), and correlation computation of the detection signals of this pair is carried out, the eccentric directions of the light-blocking film openings of the respective phase difference detection pixels A, A' are the same (a light beam that passes through the same side with respect to the main axis of the imaging lens is incident thereon). Therefore, in the present exemplary embodiment, it is possible to compute only the distortion amount due to the rolling shutter. In the present exemplary embodiment, by using the detection signals from these pairs of phase difference detection pixels, the phase difference amounts that are computed at the above-described usual phase difference detection pixel pairs are corrected, and AF control is carried out.

Note that, hereinafter, a pair of phase difference detection pixels (a pair that is formed from the phase difference detection pixels 1x, 1y), that are adjacent diagonally and that detect the phase difference for imaged subject range finding, is simply called a phase difference detection pixel pair. Further, a pair of phase difference detection pixels (a pair that is formed from two phase difference detection pixels 1x that are disposed on odd-numbered lines, or a pair that is formed from two phase difference detection pixels 1y that are disposed on even-numbered lines), that are for detecting the distortion amount due to the rolling shutter, are called a rolling detection pixel pair in order to distinguish from the aforementioned phase difference detection pixel pair.

FIG. 6 is a flowchart showing the flow of AF control relating to the present exemplary embodiment.

In step 100, correlation computation is carried out on detection signals (hereinafter also called phase difference detection pixel signals upon occasion), that are read out respectively from the respective phase difference detection pixels that configure phase difference detection pixel pairs that are formed from predetermined phase difference detection pixels 1x, 1y that are diagonally adjacent, and phase difference amounts are determined. For example, in the example shown in FIG. 7, the pixels that configure the phase difference detection pixel pairs are hatched (the same holds as well for FIG. 8 through FIG. 12 that are described hereinafter). Concretely, the respective pairs of phase difference detection pixels 1x, 1y, that are diagonally adjacent in the seventh line and the eighth line and at which G color filters are provided, are used as the phase difference detection pixel pairs.

Figure 7:
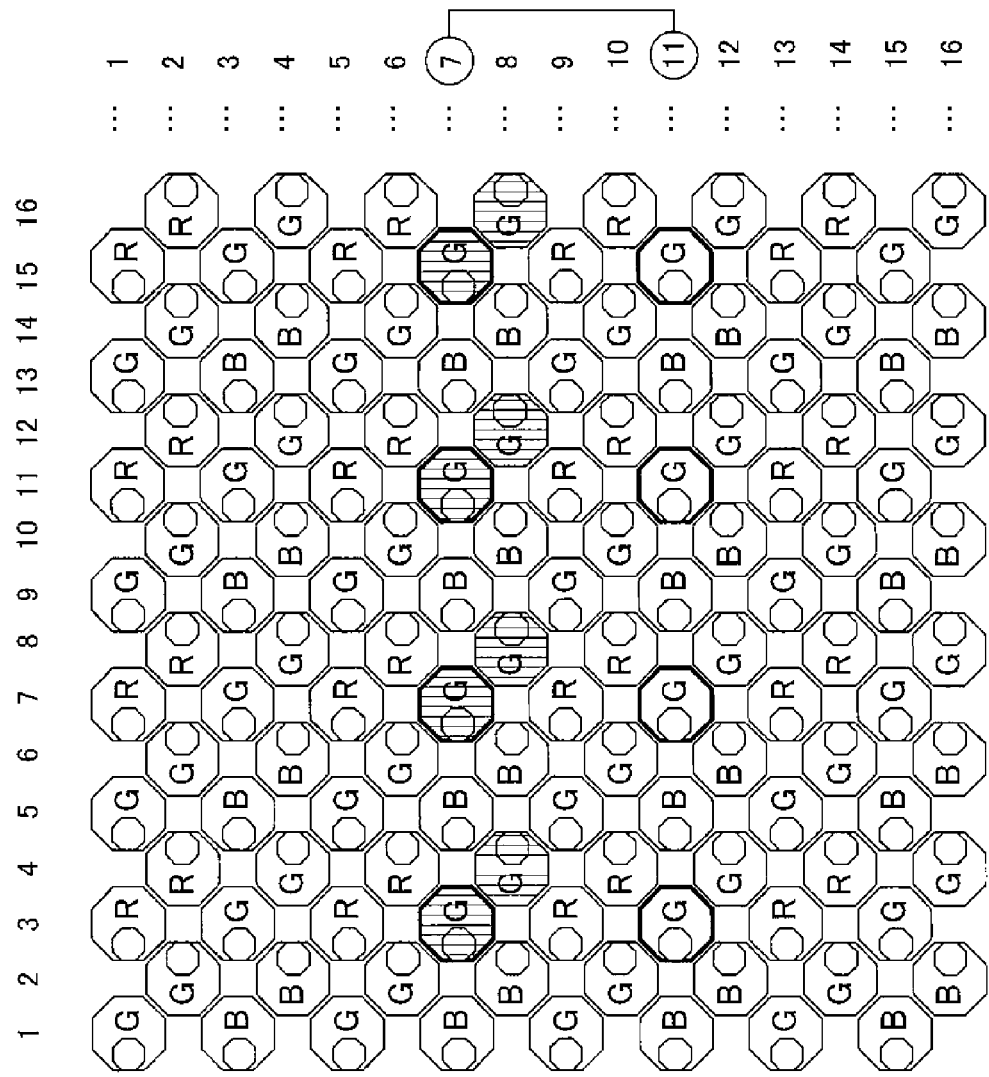
FIG. 7 is a drawing that shows a concrete example of phase difference detection pixels used in order to compute the distortion amount due to the rolling shutter, and that is for explaining a computing method at the time of computing the distortion amount due to the rolling shutter by using these.

In step 102, correlation computation is carried out on the detection signals (hereinafter also called rolling detection pixel signals upon occasion), that are read out from the respective phase difference detection pixels that configure rolling detection pixel pairs, and distortion amounts due to the rolling shutter are determined. For example, the combination of the phase difference detection pixel 1x, that is that is disposed on an odd-numbered line among the aforementioned phase difference detection pixel pairs, and the phase difference detection pixel 1x, that is disposed on an odd-numbered line that is different than the odd-numbered line on which the aforementioned phase difference detection pixel 1x is disposed and at which a color filter of the same color is provided, may be made to be a rolling detection pixel pair. Further, the combination of the phase difference detection pixel 1y, that is that is disposed on an even-numbered line among the aforementioned phase difference detection pixel pairs, and the phase difference detection pixel 1y, that is disposed on an even-numbered line that is different than the even-numbered line on which the aforementioned phase difference detection pixel 1y is disposed and at which a color filter of the same color is provided, may be made to be a rolling detection pixel pair. In FIG. 7, the examples of the pixels that configure the rolling detection pixel pairs are marked in bold lines (the same holds as well for FIG. 8 through FIG. 12 that are described hereinafter). Concretely, pixels, that are combinations of the phase difference detection pixels 1x of G color in the seventh line and the phase difference detection pixels 1x of G color of the eleventh line, and whose distances from the ends of the respective lines, i.e., positions in the horizontal direction, are the same, are made to be rolling detection pixel pairs.

Namely, in the example shown in FIG. 7, correlation computation is carried out on the detection signals of each of the rolling detection pixel pair that is configured by the phase difference detection pixel 1x of the seventh line and the third column and the phase difference detection pixel 1x of the eleventh line and the third column, and the rolling detection pixel pair that is configured by the phase difference detection pixel 1x of the seventh line and the seventh column and the phase difference detection pixel 1x of the eleventh line and the seventh column, and the rolling detection pixel pair that is configured by the phase difference detection pixel 1x of the seventh line and the eleventh column and the phase difference detection pixel 1x of the eleventh line and the eleventh column, and the rolling detection pixel pair that is configured by the phase difference detection pixel 1x of the seventh line and the fifteenth column and the phase difference detection pixel 1x of the eleventh line and the fifteenth column. The offset amounts determined from this correlation computation are multiplied by ¼, and the distortion amount due to the rolling shutter is determined.

Here, the reason why the offset amounts are multiplied by ¼ is that the phase difference detection pixel pairs are pixels of the seventh line and the eight line, whereas the rolling detection pixel pairs are pixels of the seventh line and the eleventh line. Therefore, the separated distance in the vertical direction of the respective pixels of the rolling detection pixel pairs is four times the separation distance in the vertical direction of the respective pixels of the phase difference detection pixel pairs, and four times the time is needed for reading out.

Note that, here, explanation is given of an example in which the distortion amount due to the rolling shutter is computed by using sets of G pixels (sets of the phase difference detection pixels 1x of G color) of the seventh line and the eleventh line. However, the distortion amount due to the rolling shutter may be computed by using G pixels of the seventh line and the fifteenth line. In this case, the correlation computation results of the rolling detection pixel signals must be multiplied by ⅛. Further, the distortion amount due to the rolling shutter may be computed by using sets of G pixels (sets of the phase difference detection pixels 1y of G color) of the eighth line and the twelfth line.

In step 104, the distortion amount due to the rolling shutter that was determined in step 102 is subtracted from the phase difference amount determined in step 100, and the phase difference amount determined in step 100 is corrected.

In step 106, focus control is carried out as described above, on the basis of the corrected phase difference amount.

MODIFIED EXAMPLE 1 OF COMPUTATION OF DISTORTION AMOUNT DUE TO ROLLING SHUTTER

Note that the method of computing the distortion amount due to the rolling shutter is not limited to the example that was described by using above-described FIG. 7. For example, plural distortion amounts due to the rolling shutter may be computed, and these may be averaged so as to determine a final distortion amount due to the rolling shutter, and this may be used in correction.

Figure 8:
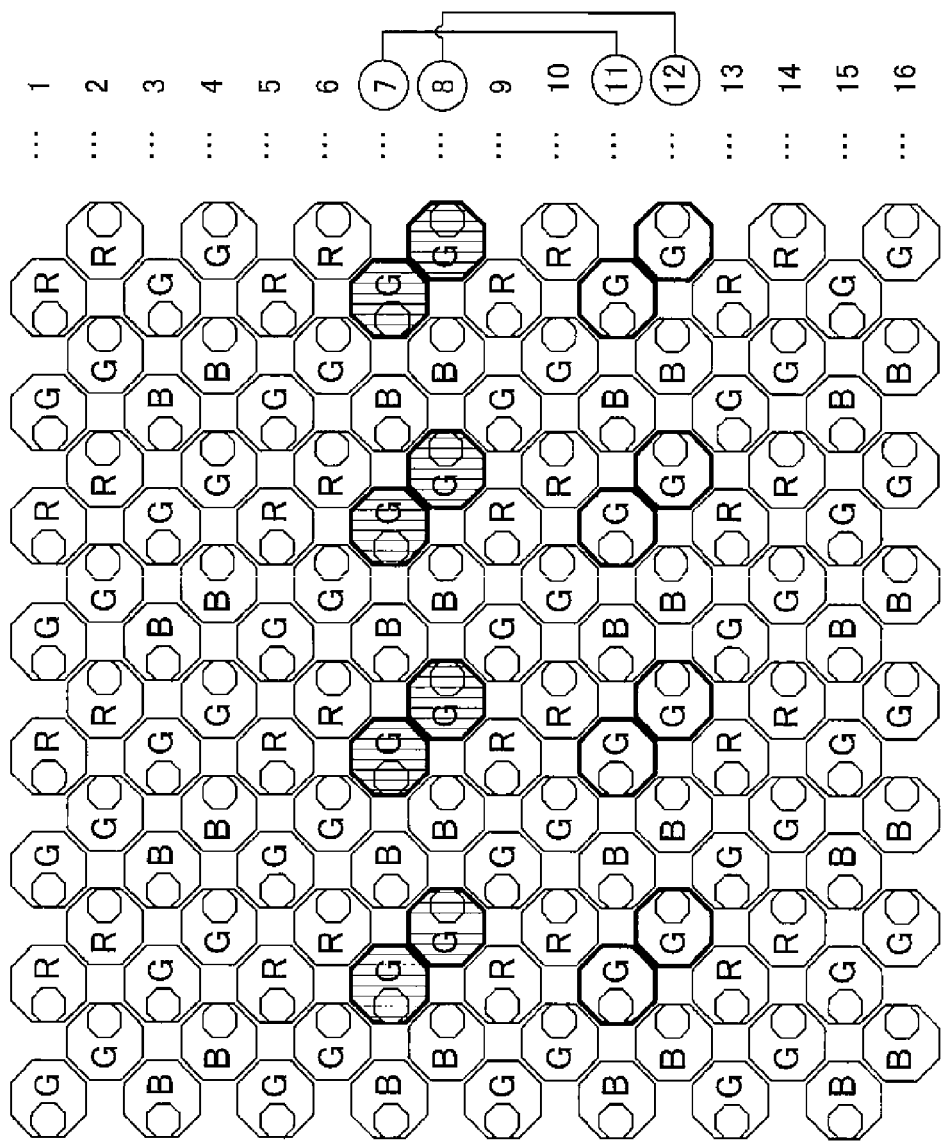
FIG. 8 is a drawing that shows another example of phase difference detection pixels used in order to compute the distortion amount due to the rolling shutter, and that is for explaining a computing method at the time of computing the distortion amount due to the rolling shutter by using these.

Concretely, for example, correlation computation of the detection signals read out from the rolling detection pixel pairs shown in FIG. 7 may be carried out and the distortion amount due to the rolling shutter determined (this is called the first distortion amount due to the rolling shutter), and, in addition, as shown in FIG. 8, correlation computation may be carried out on the detection signals that are read out from each of the rolling detection pixel pair configured by the phase difference detection pixel 1y of the eighth line and the fourth column and the phase difference detection pixel 1y of the twelfth line and the fourth column, and the rolling detection pixel pair configured by the phase difference detection pixel 1y of the eighth line and the eighth column and the phase difference detection pixel 1y of the twelfth line and the eighth column, and the rolling detection pixel pair configured by the phase difference detection pixel 1y of the eighth line and the twelfth column and the phase difference detection pixel 1y of the twelfth line and the twelfth column, and the rolling detection pixel pair configured by the phase difference detection pixel 1y of the eighth line and the sixteenth column and the phase difference detection pixel 1y of the twelfth line and the sixteenth column. Moreover, in this method, in order to determine the distortion amount due to the rolling shutter (this is called the second distortion amount due to the rolling shutter), the average value of the first distortion amount due to the rolling shutter and the second distortion amount due to the rolling shutter may be determined, and this average value may be used in the correction in step 104. Due thereto, the computation accuracy of the distortion amount due to the rolling shutter becomes higher, and the precision of the AF control improves.

Note that, here, description is given of an example in which two distortion amounts due to the rolling shutter are computed and averaged and used in correction. However, three or more distortion amounts due to the rolling shutter may be computed and averaged and used in correction.

MODIFIED EXAMPLE 2 OF COMPUTATION OF DISTORTION AMOUNT DUE TO ROLLING SHUTTER

Note that a "usual imaging" mode and a "pixel addition imaging" mode may be provided at the digital camera 10. In the "usual imaging" mode, a highly detailed image of the imaged subject is generated from the individual output signals of all of the pixels. In the "pixel addition imaging" mode, highly sensitive imaging is carried out instead of making the resolution be low resolution, by adding the signals of plural pixels, such as 2-pixel addition or 4-pixel addition or the like, to the output signals of all of the pixels. Which imaging is to be carried out is implemented by switching the driving pulses that the timing generator 32 supplies to the solid-state imaging element (CMOS) 24. As a result of four pixel addition, the resolution of the image of the imaged subject becomes ¼ of the number of pixels of the solid-state imaging element, and the exposure amount becomes four times. Therefore, it becomes possible to obtain an image of a high S/N even in dark scenes.

In this case, it suffices to make it such that the AF control also carries out control in accordance with the imaging mode. Namely, the phase difference amount can be determined by carrying out correlation computation on an addition signal, that is obtained by adding detection signals of plural phase difference detection pixels 1x whose distances from one ends of lines are equal to one another, and an addition signal, that is obtained by adding detection signals of plural phase difference detection pixels 1y whose distances from one ends of lines are equal to one another. Note that, in the following explanation, there are also cases in which the addition of detection signals from plural pixels that have the same difference from one ends of lines is called vertical addition.

Figure 9:
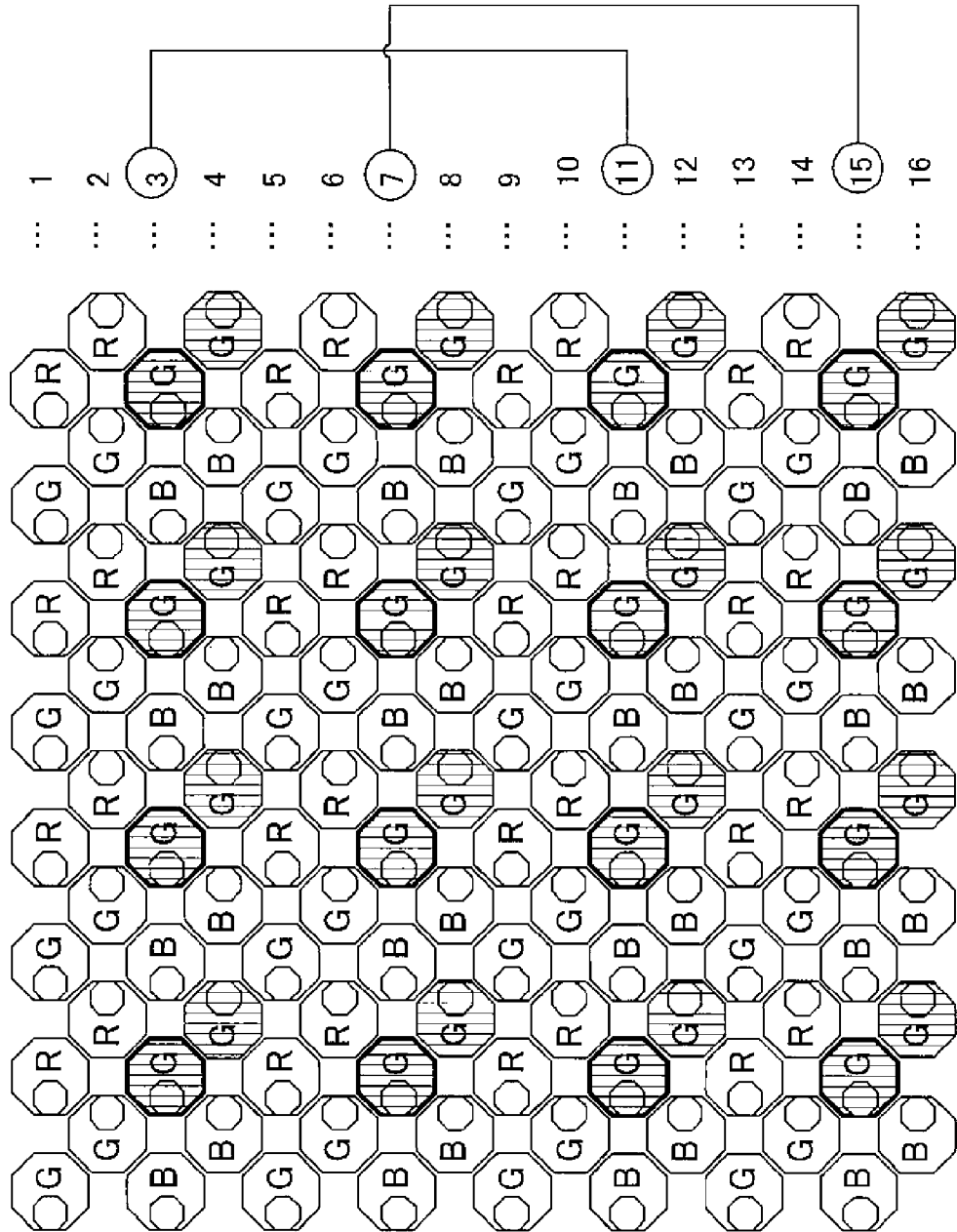
FIG. 9 is a drawing that shows another example of phase difference detection pixels used in order to compute the distortion amount due to the rolling shutter, and that is for explaining a computing method at the time of computing the distortion amount due to the rolling shutter by using these.

For example, as shown in FIG. 9, correlation computation is carried out on addition signals, that are obtained by adding the detection signals of the G-color phase difference detection pixels 1x of the third, seventh, eleventh, fifteenth lines, and addition signals, that are obtained by adding the detection signals of the G-color phase difference detection pixels 1y of the fourth, eighth, twelfth, sixteenth lines, and a phase difference amount is determined, and AF control is carried out. Further, in this case as well, the distortion amount due to the rolling shutter may be computed and corrected. Here, not only the G-color phase difference detection pixels 1x of the seventh line and the eleventh line are used, but also, the G-color phase difference detection pixels 1x of the third line and the fifteenth line are used in combination therewith.

More concretely, addition signal a, that is obtained by adding the detection signal of the G-color phase difference detection pixel 1x of the third line and the detection signal of the G-color phase difference detection pixel 1x of the eleventh line, may be determined per pixels whose positions in the horizontal direction are the same, and addition signal b, that is obtained by adding the detection signal of the G-color phase difference detection pixel 1x of the seventh line and the detection signal of the G-color phase difference detection pixel 1x of the fifteenth line, may be determined per pixels whose positions in the horizontal direction are the same, and correlation computation may be carried out on these addition signals a, b for the pixels whose positions in the horizontal direction are the same, and the distortion amount due to the rolling shutter may be determined.

By combining numerous phase difference detection pixels and using them in the computing of the distortion amount due to the rolling shutter in this way, the high S/N of the signal increases, and the accuracy of computing the distortion amount due to the rolling shutter improves.

Still further, addition signal c, that is obtained by adding the detection signal of the G-color phase difference detection pixel 1y of the fourth line and the detection signal of the G-color phase difference detection pixel 1y of the twelfth line, is determined per pixels whose positions in the horizontal direction are the same. Next, addition signal d, that is obtained by adding the detection signal of the G-color phase difference detection pixel 1y of the eighth line and the detection signal of the G-color phase difference detection pixel 1y of the sixteenth line, is determined per pixels whose positions in the horizontal direction are the same. Next, correlation computation is carried out on the addition signals c, d for the pixels whose positions in the horizontal direction are the same, and the distortion amount due to the rolling shutter is determined, and further, the average value of this distortion amount and the distortion amount due to the rolling shutter, that was determined from above-described addition signals a b, may be determined as the final distortion amount due to the rolling shutter.

MODIFIED EXAMPLE 3 OF COMPUTATION OF DISTORTION AMOUNT DUE TO ROLLING SHUTTER

Still further, the distortion amount due to the rolling shutter can be computed by carrying out vertical addition by using pixels of different colors (not illustrated). Concretely, for example, an addition signal e, that is obtained by adding the detection signal of the R-color phase difference detection pixel 1x of the fifth line and the detection signal of the G-color phase difference detection pixel 1x of the seventh line, is determined per pixels whose positions in the horizontal direction are the same. Next, an addition signal f, that is obtained by adding the detection signal of the G-color phase difference detection pixel 1x of the seventh line and the detection signal of the R-color phase difference detection pixel 1x of the ninth line, is determined per pixels whose positions in the horizontal direction are the same. Correlation computation may be carried out on these addition signals e, f for the pixels whose positions in the horizontal direction are the same, and the distortion amount due to the rolling shutter may be determined

MODIFIED EXAMPLE 4 OF COMPUTATION OF DISTORTION AMOUNT DUE TO ROLLING SHUTTER

Still further, although not illustrated, also in cases in which two or more distortion amounts due to the rolling shutter are determined, averaged and used as shown as an example in FIG. 8, vertical addition can be carried out by using pixels of different colors, and the distortion amount due to the rolling shutter can be determined.

Concretely, for example, the addition signal e, that is obtained by adding the detection signal of the R-color phase difference detection pixel 1x of the fifth line and the detection signal of the G-color phase difference detection pixel 1x of the seventh line, is determined per pixels whose positions in the horizontal direction are the same. Next, the addition signal f, that is obtained by adding the detection signal of the G-color phase difference detection pixel 1x of the seventh line and the detection signal of the R-color phase difference detection pixel 1x of the ninth line, is determined per pixels whose positions in the horizontal direction are the same. Next, correlation computation of the addition signals e, f for the pixels whose positions in the horizontal direction are the same is carried out, and the distortion amount due to the rolling shutter is determined (this is called the first distortion amount due to the rolling shutter), and an addition signal g, that is obtained by adding the detection signal of the R-color phase difference detection pixel 1y of the sixth line and the detection signal of the G-color phase difference detection pixel 1y of the eighth line, is determined per pixels whose positions in the horizontal direction are the same. Next, an addition signal h, that is obtained by adding the detection signal of the G-color phase difference detection pixel 1y of the eighth line and the detection signal of the R-color phase difference detection pixel 1y of the tenth line, is determined per pixels whose positions in the horizontal direction are the same. Next, correlation computation of the addition signals g, h for the pixels whose positions in the horizontal direction are the same is carried out, and the distortion amount due to the rolling shutter is determined (this is called the second distortion amount due to the rolling shutter). Moreover, the average value of the first distortion amount due to the rolling shutter and the second distortion amount due to the rolling shutter is determined as the final distortion amount due to the rolling shutter, and is used in correction of the phase difference amount.

Due thereto, the accuracy of computing the distortion amount due to the rolling shutter may be improved, and the accuracy of the AF control may be improved.

MODIFIED EXAMPLE 5 OF COMPUTATION OF DISTORTION AMOUNT DUE TO ROLLING SHUTTER

Further, the plural distortion amounts due to the rolling shutter, that are determined from detection signals of plural rolling detection pixel pairs of different colors that are lined-up at the same position in the vertical direction, can also be averaged and used. Description is given hereinafter with reference to FIG. 10, FIG. 11 and FIG. 12. Note that, in FIG. 10, FIG. 11 and FIG. 12 as well, the pixels that are marked by hatching are pixels that are used in computing the phase difference amount used in range finding, and the pixels drawn in bold lines are pixels that are used in computing the distortion amount due to the rolling shutter, in the same way as in FIG. 7, FIG. 8 and FIG. 9.

Figure 10:
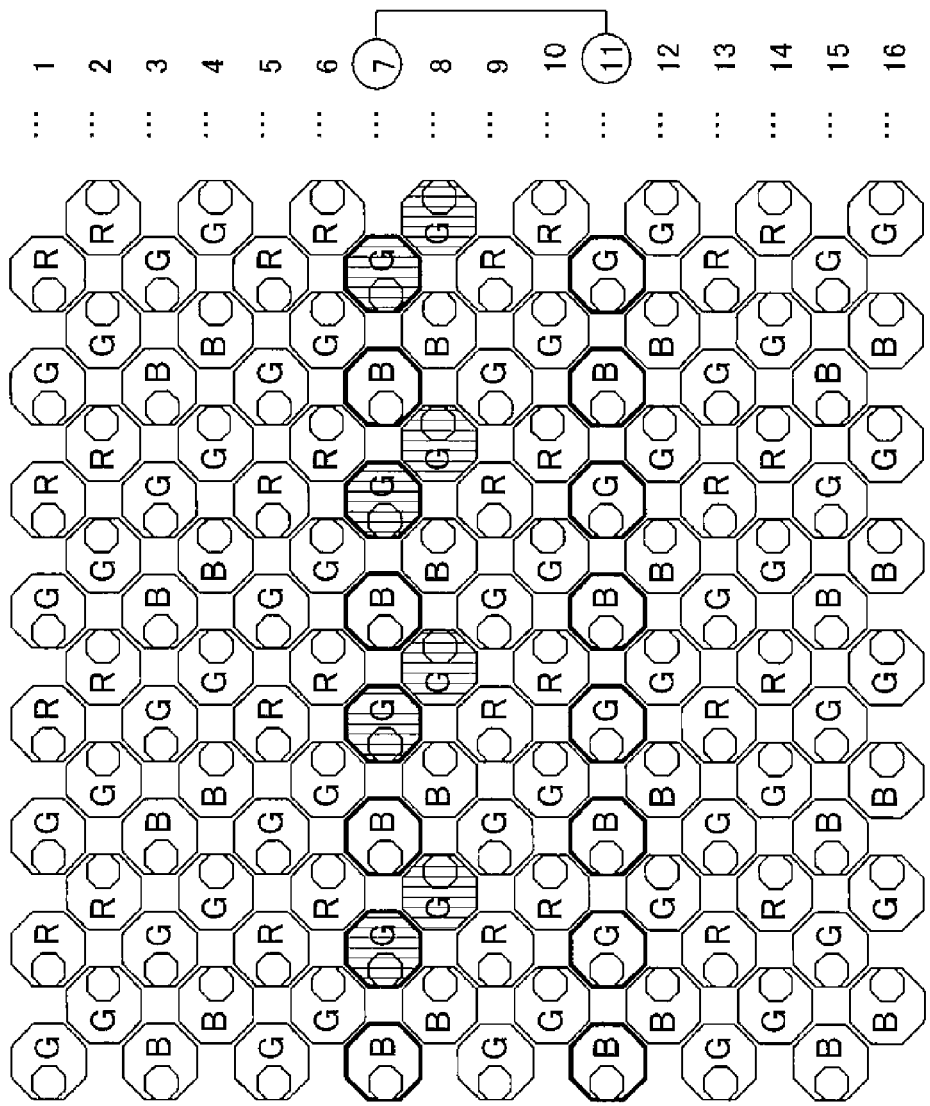
FIG. 10 is a drawing that shows another example of phase difference detection pixels used in order to compute the distortion amount due to the rolling shutter, and that is for explaining a computing method at the time of computing the distortion amount due to the rolling shutter by using these.

As shown in FIG. 10, in a case in which the phase difference amount is determined by using the G-color phase difference detection pixels 1x of the seventh line and the phase difference detection pixels 1y of the eighth line as the phase difference detection pixel pairs, the distortion amount due to the rolling shutter, that is determined by correlation computation of the G-color detection signals of the seventh line and the eleventh line, and the distortion amount due to the rolling shutter, that is determined by correlation computation of the B pixels of the seventh line and the eleventh line, are averaged, and the final distortion amount due to the rolling shutter is determined, and this is used in correcting of the phase difference amount.

Figure 11:
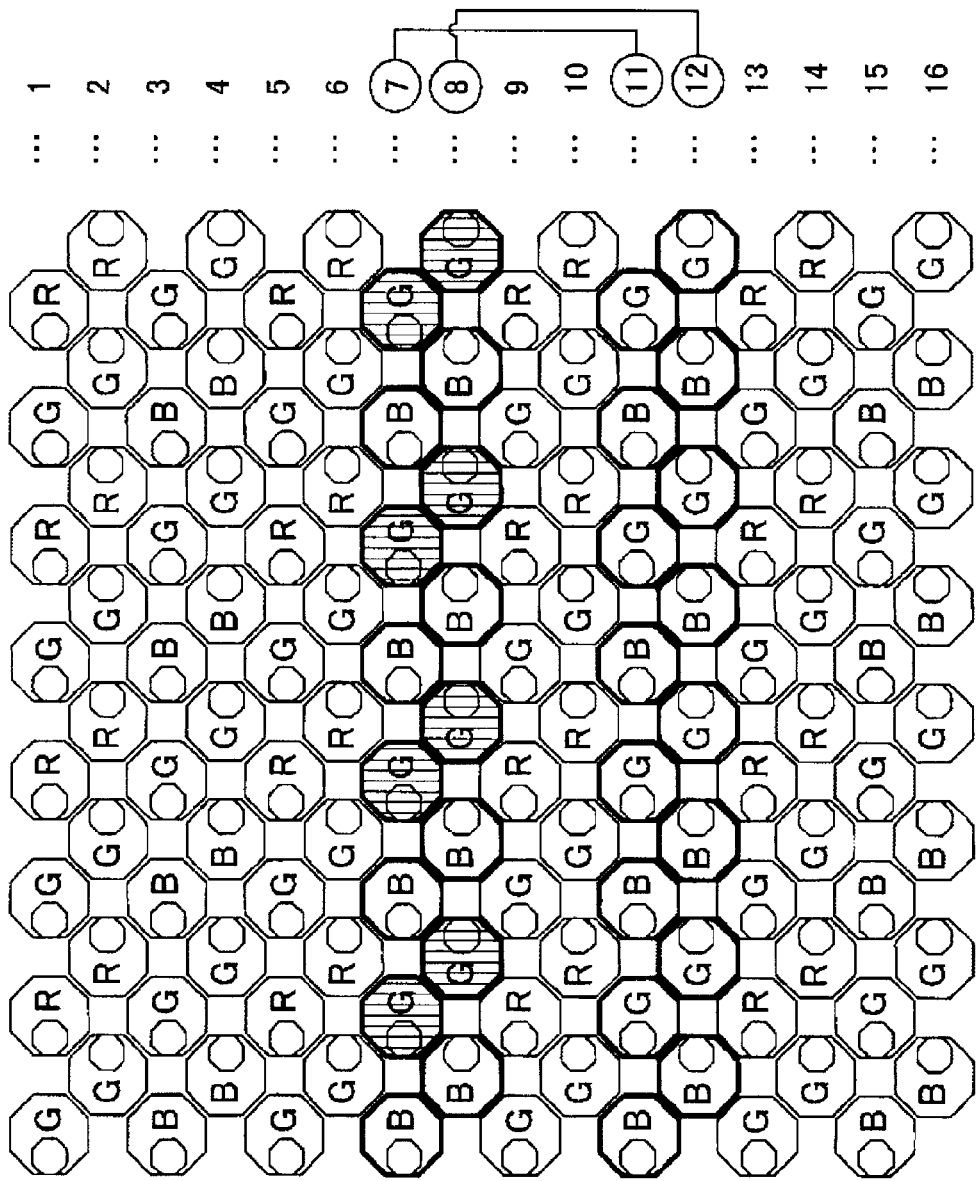
FIG. 11 is a drawing that shows another example of phase difference detection pixels used in order to compute the distortion amount due to the rolling shutter, and that is for explaining a computing method at the time of computing the distortion amount due to the rolling shutter by using these.

Further, as shown in FIG. 11, in a case in which the phase difference amount is determined by using the G-color phase difference detection pixels 1x of the seventh line and the phase difference detection pixels 1y of the eighth line as the phase difference detection pixel pairs, first the distortion amount due to the rolling shutter, that is determined by correlation computation of the G-color detection signals of the seventh line and the eleventh line, and the distortion amount due to the rolling shutter, that is determined by correlation computation of the detection signals of the B pixels of the seventh line and the eleventh line, are averaged and the first distortion amount due to the rolling shutter is determined. Moreover, the distortion amount due to the rolling shutter, that is determined by correlation computation of the G-color detection signals of the eighth line and the twelfth line, and the distortion amount due to the rolling shutter, that is determined by correlation computation of the detection signals of the B pixels of the eighth line and the twelfth line, are averaged and the second distortion amount due to the rolling shutter is determined. Then, the average value of the first distortion amount due to the rolling shutter and the second distortion amount due to the rolling shutter is determined as the final distortion amount due to the rolling shutter, and this may be used in correcting the phase difference amount.

Figure 12:
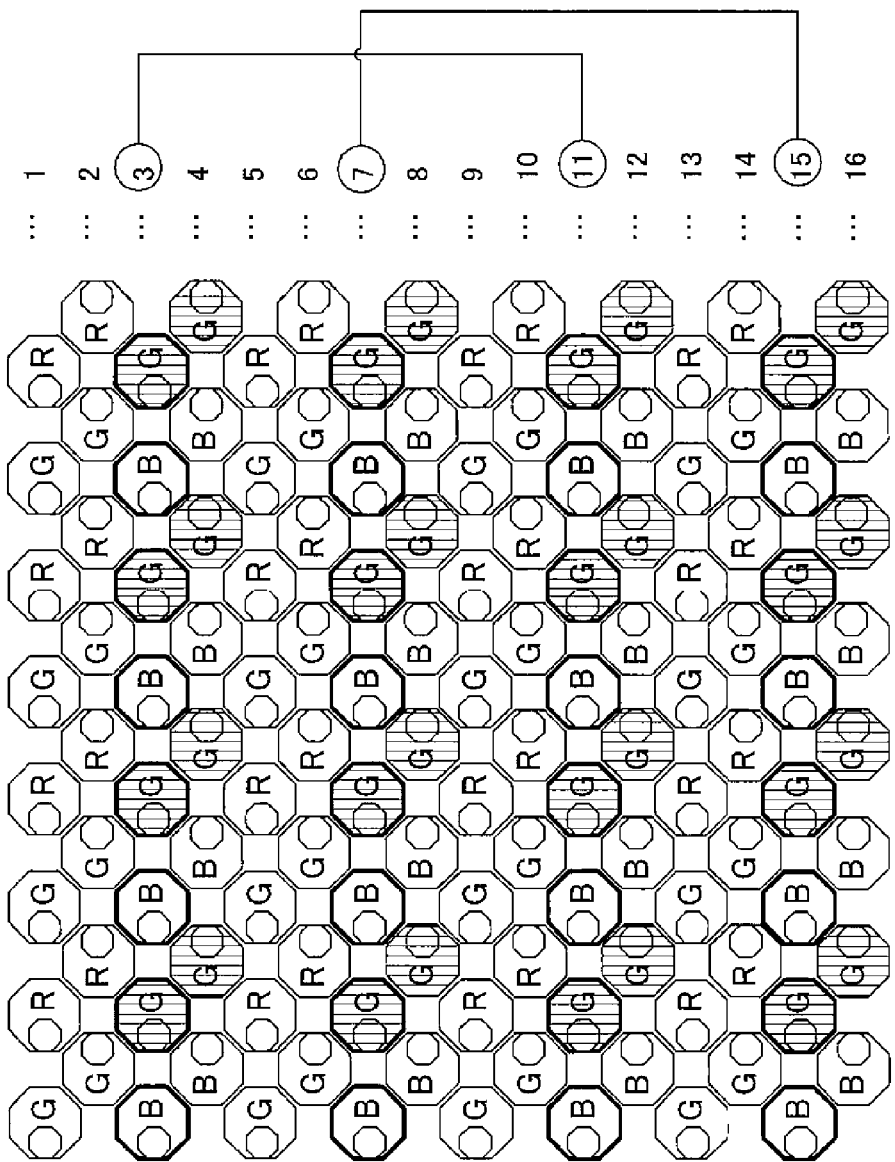
FIG. 12 is a drawing that shows another example of phase difference detection pixels used in order to compute the distortion amount due to the rolling shutter, and that is for explaining a computing method at the time of computing the distortion amount due to the rolling shutter by using these.

Further, as shown in FIG. 12, also in a case in which the distortion amount due to the rolling shutter is determined by vertical addition, similarly, first, an addition signal k, that is obtained by adding the detection signal of the G-color phase difference detection pixel 1x of the third line and the detection signal of the G-color phase difference detection pixel 1x of the eleventh line, is determined per pixels whose positions in the horizontal direction are the same. Next, an addition signal 1, that is obtained by adding the detection signal of the G-color phase difference detection pixel 1x of the seventh line and the detection signal of the G-color phase difference detection pixel 1x of the fifteenth line, is determined per pixels whose positions in the horizontal direction are the same. Next, correlation computation of the addition signals k, 1 for the pixels whose positions in the horizontal direction are the same is carried out, and a first distortion amount due to the rolling shutter is determined. Moreover, an addition signal m, that is obtained by adding the detection signal of the B-color phase difference detection pixel 1x of the third line and the detection signal of the B-color phase difference detection pixel 1x of the eleventh line, is determined per pixels whose positions in the horizontal direction are the same, and an addition signal n, that is obtained by adding the detection signal of the B-color phase difference detection pixel 1x of the seventh line and the detection signal of the B-color phase difference detection pixel 1x of the fifteenth line, is determined per pixels whose positions in the horizontal direction are the same. Moreover, correlation computation of the addition signals m, n for the pixels whose positions in the horizontal direction are the same is carried out, and a second distortion amount due to the rolling shutter is determined. Then, the average value of the first distortion amount due to the rolling shutter and the second distortion amount due to the rolling shutter is determined as the final distortion amount due to the rolling shutter, and this may be used in correction of the phase difference amount.

Note that the distortion amount due to the rolling shutter may be determined as follows (not illustrated). First, the final distortion amount due to the rolling shutter, that was determined by computation as described by using FIG. 12, is here not called the final distortion amount due to the rolling shutter, and for the time being, this is made to be a distortion amount A due to the rolling shutter. Moreover, an addition signal p, that is obtained by adding the detection signal of the G-color phase difference detection pixel 1y of the fourth line and the detection signal of the G-color phase difference detection pixel 1y of the twelfth line, is determined per pixels whose positions in the horizontal direction are the same. Next, an addition signal q, that is obtained by adding the detection signal of the G-color phase difference detection pixel 1y of the eighth line and the detection signal of the G-color phase difference detection pixel 1y of the sixteenth line, is determined per pixels whose positions in the horizontal direction are the same. Correlation computation of the addition signals p, q for the pixels whose positions in the horizontal direction are the same is carried out, and a third distortion amount due to the rolling shutter is determined. Next, an addition signal r, that is obtained by adding the detection signal of the B-color phase difference detection pixel 1y of the fourth line and the detection signal of the B-color phase difference detection pixel 1y of the twelfth line, is determined per pixels whose positions in the horizontal direction are the same, and an addition signal s, that is obtained by adding the detection signal of the B-color phase difference detection pixel 1y of the eighth line and the detection signal of the B-color phase difference detection pixel 1y of the sixteenth line, is determined per pixels whose positions in the horizontal direction are the same. Moreover, correlation computation of the addition signals r, s for the pixels whose positions in the horizontal direction are the same is carried out, and a fourth distortion amount due to the rolling shutter is determined. Moreover, the average value of the third distortion amount due to the rolling shutter and the fourth distortion amount due to the rolling shutter is made to be distortion amount B due to the rolling shutter. Then, the average value of this distortion amount A due to the rolling shutter and distortion amount B due to the rolling shutter is determined as the final distortion amount due to the rolling shutter, and this may be used in correcting the phase difference amount.

In this way, the distortion amount due to the rolling shutter is computed by using and averaging rolling detection pixel pairs of different colors, and the computational accuracy of the distortion amount due to the rolling shutter may be improved.

Note that, in the present exemplary embodiment, description is given of an example in which rolling correction is always carried out. However, the present invention is not limited thereto. For example, a switching means that switches between a first mode, that carries out rolling correction in the AF control, and a second mode, that does not carry out rolling correction, may be provided, and AF control may be carried out in accordance with the mode that a user has switched to by using this switching means.

Second Exemplary Embodiment

Note that the distortion amount due to the rolling shutter varies in accordance with movement of the imaged subject and changes in the angle of view, and therefore, is not always constant. Thus, in a case in which the final distortion amount due to the rolling shutter is computed by averaging plural distortion amounts due to the rolling shutter such as explained by using above-described FIG. 8 and FIG. 10 through FIG. 12, if the plural distortion amounts due to the rolling shutter differ greatly, it can be determined that the movement of the imaged subject or the angle of view has changed suddenly, and the AF operation may be cancelled. This control is described in detail hereinafter. Note that, because the configuration of the digital camera 10 of the present exemplary embodiment is similar to that of the first exemplary embodiment, description thereof is omitted.

Figure 13:
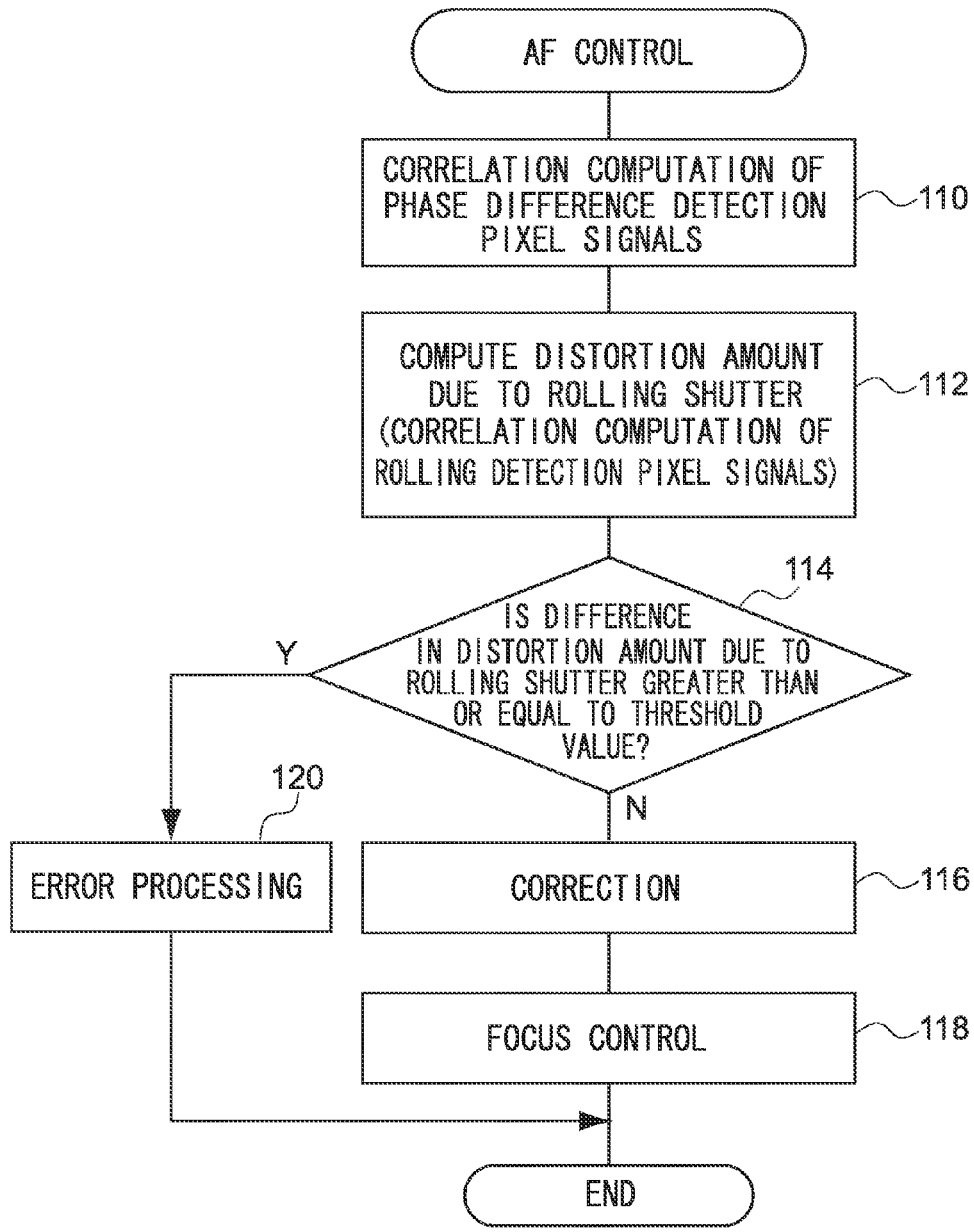
FIG. 13 is a flowchart showing an example of the flow of AF control processing relating to a second exemplary embodiment.

In FIG. 13, in step 110, correlation computation of phase difference detection pixel signals is carried out and a phase difference amount is determined, as described in the first exemplary embodiment.

In step 112, as described by using FIG. 8 and FIGS. 10 through 12 in the first exemplary embodiment, the plural distortion amounts due to rolling shutter are determined, and these are averaged, and the final distortion amount due to the rolling shutter is determined. Note that the plural distortion amounts due to the rolling shutter, that are computed before the final distortion amount due to the rolling shutter is computed, are stored in a predetermined storing means until the determination in step 114, that is described hereafter, ends.

In step 114, the plural distortion amounts due to the rolling shutter that are stored in the storing means (except for the final distortion amount due to the rolling shutter) are compared with one another, and it is determined whether or not there is a distortion amount for which this difference is greater than or equal to a threshold value. If the determination is negative here, the process moves on to step 116 where correction is carried out by subtracting the aforementioned distortion amount due to the rolling shutter that was determined finally, from the phase difference amount determined in step 110. Then, in step 118, focal point control is carried out on the basis of this corrected phase difference amount.

On the other hand, if the determination in step 114 is affirmative, the process proceeds to step 120 where error processing is carried out, and the present AF control is ended. This error processing is, for example, the displaying of an error message, or the like. Further, it may be made such that, after the present AF control is ended one time, AF control is executed again.

As described above, if the difference in the distortion amounts due to the rolling shutter is large, the AF control process is ended before focus control is carried out, and therefore, miss-focusing may be prevented.

Note that, here, description is given of an example in which the final distortion amount due to the rolling shutter is determined before the determination in step 114. However, after the determination in step 114 is negative, the final distortion amount due to the rolling shutter may be determined and used in correction.

Further, a switching means may be provided at the digital camera 10 that switches between a first mode, that carries out rolling correction in AF control, and a second mode, in which rolling correction is not carried out when the difference in plural computed distortion amounts due to the rolling shutter is large as described in the present exemplary embodiment, and AF control may be carried out in accordance with the mode that a user switches to by this switching means.

Third Exemplary Embodiment

In the first exemplary embodiment, description is given of an example in which, at the time of AF control, the distortion amount due to the rolling shutter is always computed and corrected. However, the processing of computing and correcting the distortion amount due to the rolling shutter may be omitted in cases in which it is presumed that the effects of distortion due to the rolling shutter are small. Detailed description is given hereinafter.

Note that, because the configuration of the digital camera 10 of the present exemplary embodiment is similar to the first exemplary embodiment, description thereof is omitted.

Figure 14:
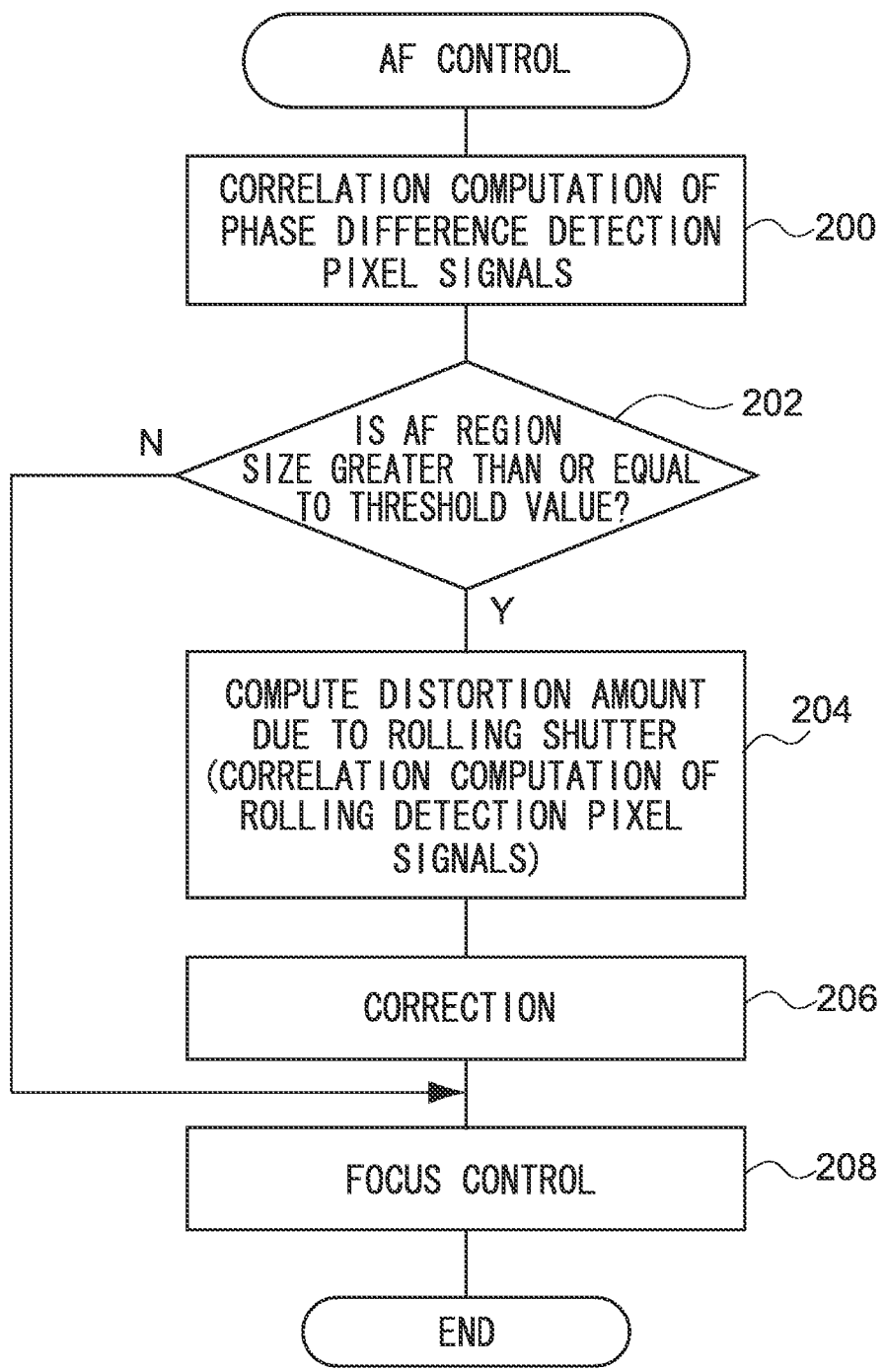
FIG. 14 is a flowchart showing an example of the flow of AF control processing relating to a third exemplary embodiment.

FIG. 14 is a flowchart showing an example of the flow of AF control processing relating to the present exemplary embodiment.

In step 200, correlation computation of phase difference detection pixel signals is carried out and a phase difference amount is determined, as described in the first exemplary embodiment.

In step 202, it is determined whether or not the AF region is a size that is greater than or equal to a predetermined threshold value. Here, the AF region is the region in which the focal point is adjusted. There are cases in which the digital camera 10 is configured such that the position and the size of the AF region can be set arbitrarily by the user of the digital camera 10, and cases in which the digital camera 10 is configured such that the size of the AF region is set in accordance with the imaging mode, and the like. In the present exemplary embodiment, information of the size of the AF region that is set at the digital camera 10 is acquired, and is compared with a predetermined threshold value.

When the determination in step 202 is affirmative, in step 204, correlation computation of rolling detection pixel signals is carried out and the distortion amount due to the rolling shutter is determined, as described in the first exemplary embodiment. In step 206, the distortion amount due to the rolling shutter, that was determined in step 204, is subtracted from the phase difference amount determined in step 200, and the phase difference amount determined in step 200 is corrected. Then, in step 208, focus control is carried out on the basis of the corrected phase difference amount.

On the other hand, when the determination in step 202 is negative, step 204 and step 206 are skipped, and the process proceeds to step 208. In this case, in step 208, focus control is carried out by using as is the phase difference amount determined in step 200 (the phase difference amount that has not been corrected by the distortion amount due to the rolling shutter).

If the AF region is not that large, the number of phase difference detection pixels that detect the phase difference for range finding also is small, and it can be thought that the effects of distortion due to the rolling shutter are small. Thus, in the present example, if the AF region is less than the threshold value, AF control is carried out without carrying out computation and correction of the distortion amount due to the rolling shutter. Due thereto, the time required for AF control may be shortened.

Figure 15:
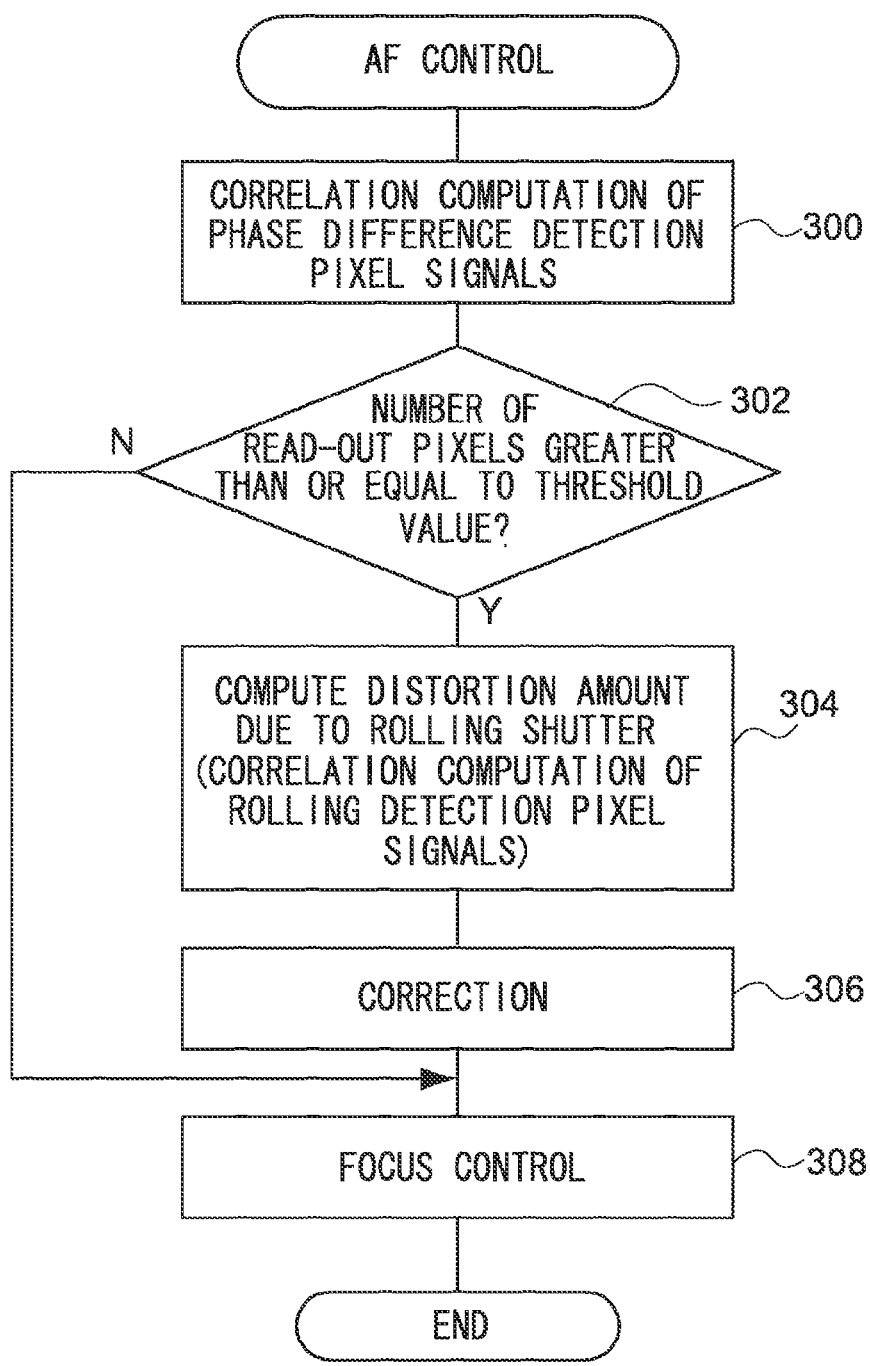
FIG. 15 is a flowchart showing another example of the flow of AF control processing relating to the third exemplary embodiment.

FIG. 15 is a flowchart showing another example of the flow of AF control processing.

In step 300, correlation computation of phase difference detection pixel signals is carried out and a phase difference amount is determined, as described in the first exemplary embodiment.

In step 302, it is determined whether or not the number of read out pixels (the number of phase difference detection pixels that were used in order to compute the phase difference amount in step 300) is greater than or equal to a predetermined threshold value. If the determination in step 302 is affirmative, in step 304, as described in the first exemplary embodiment, correlation computation of the rolling detection pixel signals is carried out, and the distortion amount due to the rolling shutter is determined. In step 306, the distortion amount due to the rolling shutter, that was determined in step 304, is subtracted from the phase difference amount determined in step 300, and the phase difference amount determined in step 300 is corrected. Then, in step 308, focus control is carried out on the basis of the corrected phase difference amount.

On the other hand, if the determination in step 302 is negative, step 304 and step 306 are skipped, and the process proceeds to step 308. In this case, in step 308, focus control is carried out by using as is the phase difference amount that was determined in step 300 (the phase difference amount that is not corrected by the distortion amount due to the rolling shutter).

If the number of read out pixels is small, it can be thought that the effects of distortion due to the rolling shutter are small. Thus, in the present exemplary embodiment, if the number of read out pixels is less than the threshold value, AF control is carried out without carrying out computation and correction of the distortion amount due to the rolling shutter. Due thereto, the time required for AF control may be shortened.

Note that the aforementioned threshold value may be changed in accordance with the angle of view. More concretely, for example, if the digital camera 10 is configured such that it is possible to switch between a wide (wide angle) mode, a standard mode and a telephoto (telephoto) mode, a threshold value may be set in advance for each mode, and the threshold value may be changed in accordance with the imaging mode at the time of AF control. Note that, the further that the angle of view is toward the telephoto side, the greater the effects of the distortion due to the rolling shutter can be assumed to be, and therefore, the threshold value at the telephoto side may be set to be small as compared with the wide side.

Figure 16:
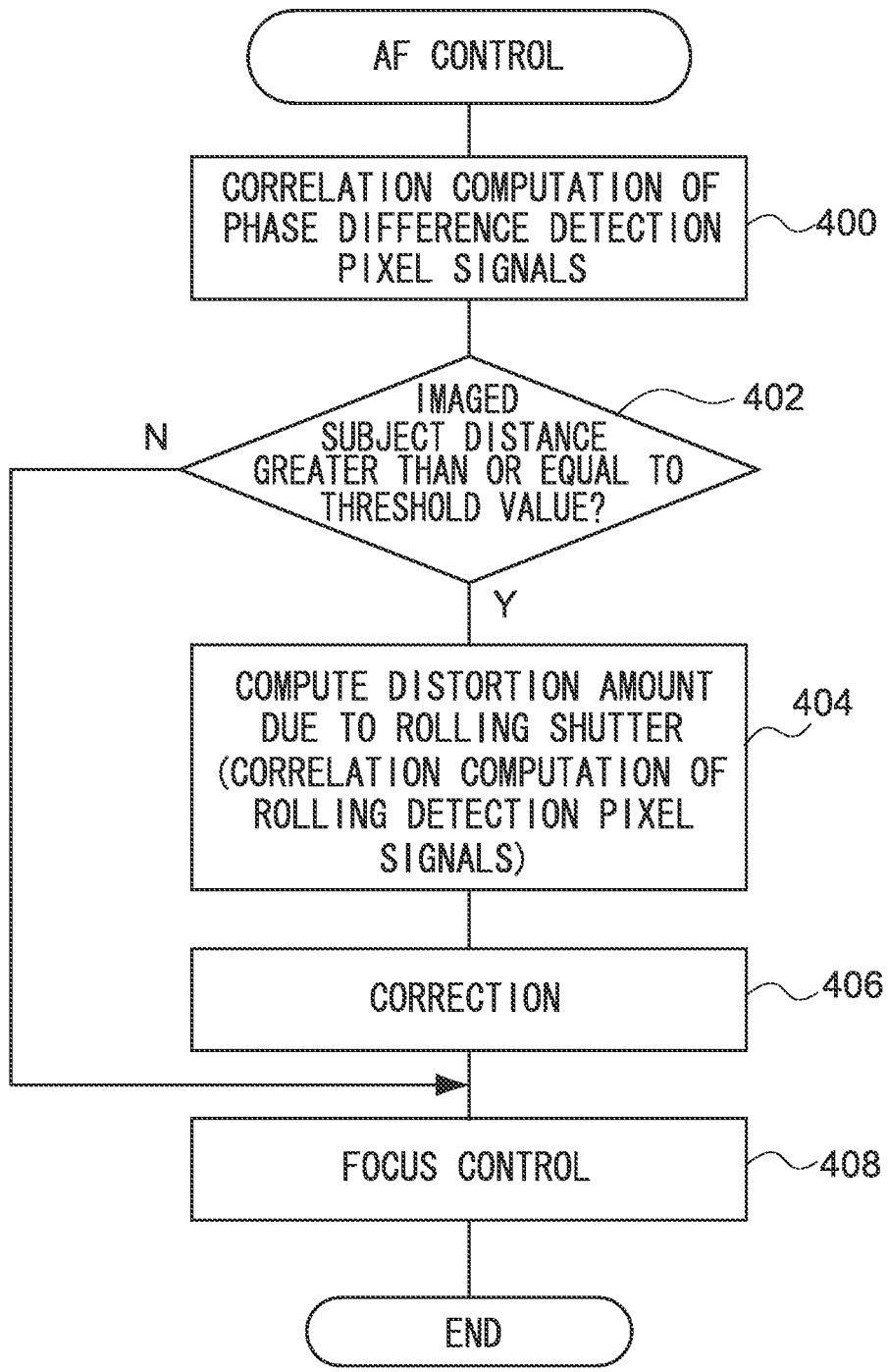
FIG. 16 is a flowchart showing another example of the flow of AF control processing relating to the third exemplary embodiment.

FIG. 16 is a flowchart showing another example of the flow of AF control processing.

In step 400, correlation computation of phase difference detection pixel signals is carried out and a phase difference amount is determined, as described in the first exemplary embodiment.

In step 402, it is determined whether or not the imaged subject distance is greater than or equal to a threshold value. Here, an imaged subject distance, that is determined provisionally from the phase difference amount that was determined in above-described step 400, is compared with a predetermined threshold value. Here, the threshold value that is compared is changed in accordance with the size of the AF region or the aforementioned number of read out pixels. If the determination in step 402 is affirmative, in step 404, as described in the first exemplary embodiment, correlation computation of rolling detection pixel signals is carried out, and the distortion amount due to the rolling shutter is determined. In step 406, the distortion amount due to the rolling shutter, that was determined in step 404, is subtracted from the phase difference amount determined in step 400, and the phase difference amount determined in step 400 is corrected. Then, in step 408, focus control is carried out on the basis of the corrected phase difference amount.

On the other hand, if the determination in step 402 is negative, step 404 and step 406 are skipped, and the process proceeds to step 408. In this case, in step 408, focus control is carried out by using as is the phase difference amount that was determined in step 400 (the phase difference amount that is not corrected by the distortion amount due to the rolling shutter).

The degree of the effect of the rolling changes due to movement of the imaged subject within the imaging angle of view. In particular, it is thought that, the longer the imaged subject distance, the greater the effect of distortion due to the rolling shutter. Thus, in the present example, when the imaged subject distance is longer than or equal to a threshold value, computation and correction of the distortion amount due to the rolling shutter are carried out, and, when the imaged subject distance is shorter than the threshold value, computation and correction of the distortion amount due to the rolling shutter are not carried out.

Figure 17:
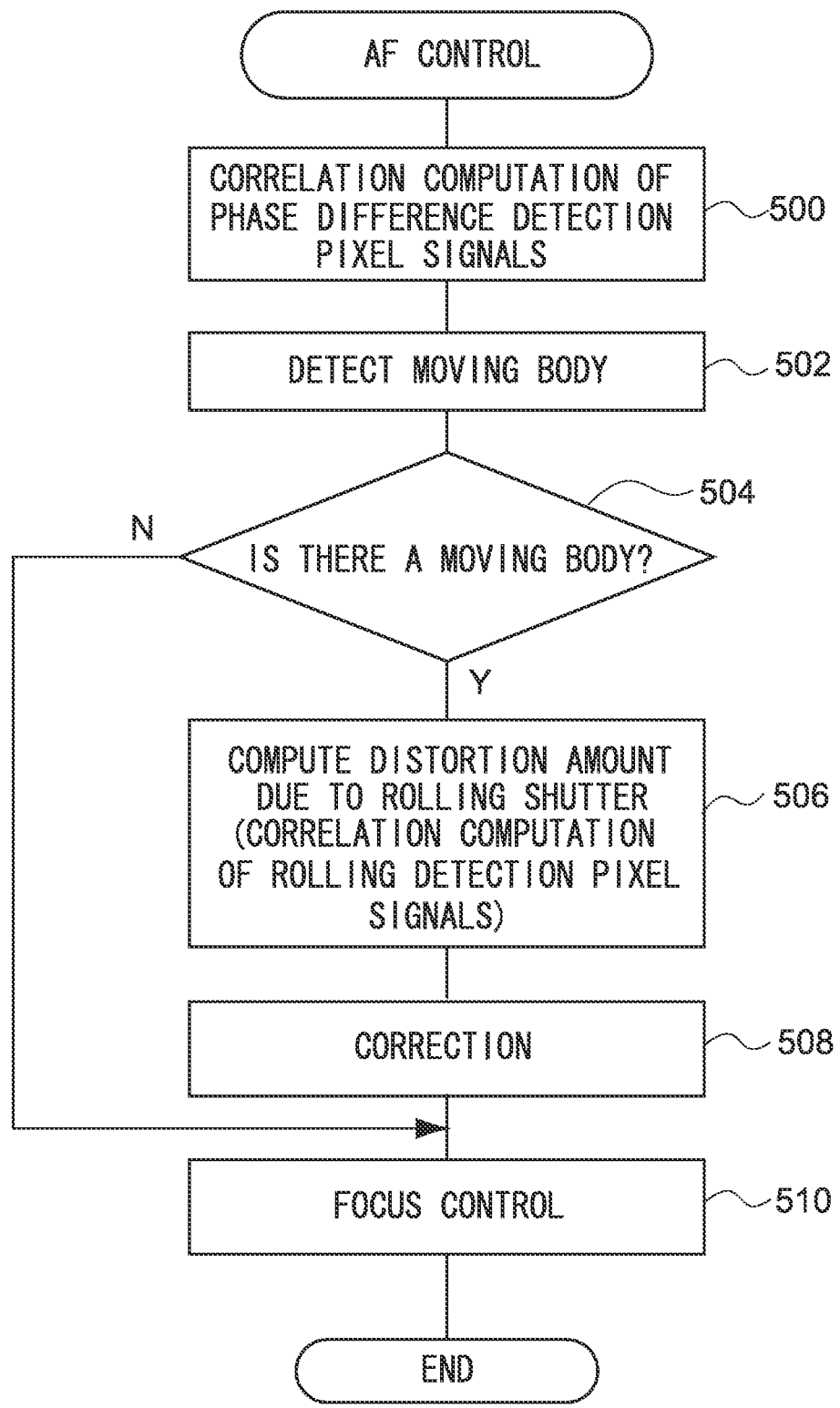
FIG. 17 is a flowchart showing another example of the flow of AF control processing relating to the third exemplary embodiment.

FIG. 17 is a flowchart showing another example of the flow of AF control processing.

In step 500, correlation computation of phase difference detection pixel signals is carried out and a phase difference amount is determined, as described in the first exemplary embodiment.

In step 502, moving body detection within the angle of view is carried out. For example, a known motion vector may be computed between past image data that is stored in the memory 48 and the image data of this time, and detection may be carried out on the basis of the magnitude of the motion vector.

In step 504, on the basis above-described detection results, it is determined whether or not a moving body exists within the angle of view. If the determination in step 504 is affirmative, in step 506, correlation computation of rolling detection pixel signals is carried out and the distortion amount due to the rolling shutter is determined as described in the first exemplary embodiment. In step 508, the distortion amount due to the rolling shutter, that was determined in step 506, is subtracted from the phase difference amount determined in step 500, and the phase difference amount determined in step 500 is corrected. Then, in step 510, focus control is carried out on the basis of the corrected phase difference amount.

On the other hand, if the determination in step 504 is negative, step 506 and step 508 are skipped, and the process proceeds to step 510. In this case, in step 510, focus control is carried out by using as is the phase difference amount that was determined in step 500 (the phase difference amount that is not corrected by the distortion amount due to the rolling shutter).

Rolling occurs in cases in which a moving body exists within the imaging angle of view. Accordingly, in the present example, a moving body is detected, and computation and correction of the distortion amount due to the rolling shutter are carried out only in cases in which a moving body exists, and computation and correction of the distortion amount due to the rolling shutter are not carried out in cases in which a moving body does not exist.

Figure 18:
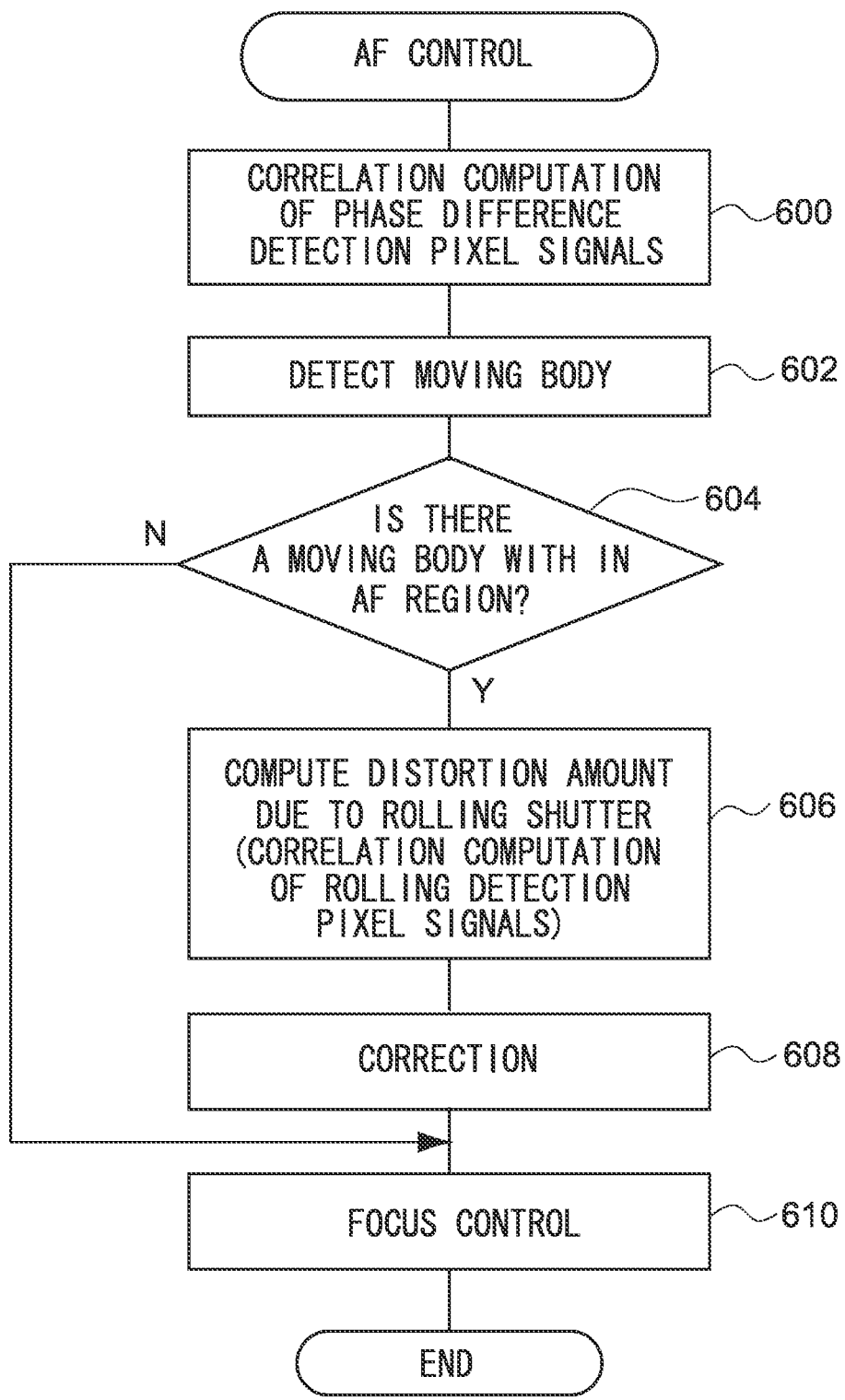
FIG. 18 is a flowchart showing another example of the flow of AF control processing relating to the third exemplary embodiment.

FIG. 18 is a flowchart showing another example of the flow of AF control processing.

In step 600, correlation computation of phase difference detection pixel signals is carried out and a phase difference amount is determined, as described in the first exemplary embodiment.

In step 602, moving body detection within the AF region is carried out. In the moving body detection, for example, a known motion vector may be computed between past image data that is stored in the memory 48 and the image data of this time, and detection may be carried out on the basis of the magnitude of the motion vector.

In step 604, on the basis above-described detection results, it is determined whether or not a moving body exists within the AF region. If the determination in step 604 is affirmative, in step 606, correlation computation of rolling detection pixel signals is carried out and the distortion amount due to the rolling shutter is determined as described in the first exemplary embodiment. In step 608, the distortion amount due to the rolling shutter, that was determined in step 606, is subtracted from the phase difference amount determined in step 600, and the phase difference amount determined in step 600 is corrected. Then, in step 610, focus control is carried out on the basis of the corrected phase difference amount.

On the other hand, if the determination in step 604 is negative, step 606 and step 608 are skipped, and the process proceeds to step 610. In this case, in step 610, focus control is carried out by using as is the phase difference amount that was determined in step 600 (the phase difference amount that is not corrected by the distortion amount due to the rolling shutter).

Rolling occurs in cases in which a moving body exists within the imaging angle of view. Accordingly, in the present example, a moving body is detected within the AF region in particular, and computation and correction of the distortion amount due to the rolling shutter are carried out only in cases in which a moving body exists within the AF region, and computation and correction of the distortion amount due to the rolling shutter are not carried out in cases in which a moving body does not exist.

As described above, in the present exemplary embodiment, in cases in which it is presumed that the effect of distortion due to the rolling shutter is small, computation and correction of the distortion amount due to the rolling shutter are not carried out, and, in other cases, computation and correction of the distortion amount due to the rolling shutter are carried out. Therefore, in the present exemplary embodiment, wasteful time in AF control may be cut while the effects of distortion due to the rolling shutter are suppressed.

Note that, in the present exemplary embodiment, whether or not computation and correction of the distortion amount due to the rolling shutter are to be carried out is determined in accordance with any of the size of the AF region, the number of read out pixels, the imaged subject distance, movement of the imaged subject within the imaging angle of view, and movement of the imaged subject within the AF region. However, the present invention is not limited thereto. For example, whether or not computation and correction of the distortion amount due to the rolling shutter are to be carried out may be determined in accordance with at least one of the size of the AF region, the number of read out pixels, the imaged subject distance, movement of the imaged subject within the imaging angle of view, and movement of the imaged subject within the AF region.

Further, a switching means that switches between a first mode, in which rolling correction is always carried out as described in the first exemplary embodiment, and a second mode, in which rolling correction is not carried out when it is presumed that the effects of distortion due to the rolling shutter are small as described in the third exemplary embodiment, may be provided at the digital camera 10. In this case, AF control may be carried out in accordance with the mode that the user has switched to by this switching means.

Further, the above-described respective exemplary embodiments described examples in which the phase difference detection region is provided at a portion of the imaging region. However, the present invention is not limited thereto. For example, an imaging element that is used exclusively for phase difference detection may be provided separately from the solid-state imaging element that is used in imaging the imaged subject, and the present invention may be applied also at times of carrying out AF control by a phase difference AF method by this imaging element.

Further, the phase difference detection pixels $1x$, $1y$ are not limited to the example shown in the above-described respective exemplary embodiments. For example, the phase difference detection pixel $1x$ may be configured such that the right half is shielded from light and the left half is open, and the phase difference detection pixel $1y$ may be configured such that the left half is shielded from light and the right half is open. In accordance with this as well, in the same way as described above, the light beam that has passed through the one side (left side) with respect to the main axis of the imaging lens is incident on the phase difference detection pixels $1x$, and the light beam that has passed through the other side (right side) with respect to the main axis of the imaging lens is incident on the phase difference detection pixels $1y$.

Further, the above respective exemplary embodiments describe cases in which the phase difference detection pixels that configure the phase difference detection pixel pair are pixels that are adjacent. However, for example, other pixels may be disposed between the pixels that configure the pair, without them being adjacent to one another.

Note that the above respective exemplary embodiments describe cases in which the present invention is applied to a digital camera. However, the present invention is not limited thereto. For example, the present invention may be made into a form that is applied to other devices having an imaging function, such as cell phones, PDAs and the like. In this case as well, effects that are similar to those of the above-described respective exemplary embodiments may be exhibited.

Moreover, the flows of the processings of the various types of processing programs described in the above exemplary embodiments also are examples. It goes without saying that changes to the order of processings of the respective steps, changes to the contents of the processings, the deletion of unnecessary steps, the addition of new steps, and the like may be made within a scope that does not deviate from the gist of the present invention.

The disclosure of Japanese Patent Application No. 2011-080033 is, in its entirety, incorporated by reference into the present Description.

All publications, patent applications, and technical standards mentioned in the present Description are incorporated by reference into the present Description to the same extent as if such individual publication, patent application, or technical standard was specifically and individually indicated to be incorporated by reference.

What is claimed is:

1. An imaging device comprising:
    an imaging element in which a plurality of first lines, at which are arrayed first phase difference detection pixels on which is incident a light beam that has passed through one side with respect to a main axis of an imaging lens, and a plurality of second lines, at which are arrayed second phase difference detection pixels on which is incident a light beam that has passed through another side with respect to the main axis of the imaging lens, are arrayed alternately;
    a reading out section that reads out, from the imaging element and by a rolling shutter method, signals of phase difference detection pixels that are arrayed at the imaging element;
    a first correlation computing section that carries out correlation computation on signals that are read out from a set formed from the first phase difference detection pixels and the second phase difference detection pixels, so as to determine phase difference amounts;
    a second correlation computing section that carries out correlation computation on signals that are read out from at least one set of a set formed from a plurality of first phase difference detection pixels that are disposed on the first line, or a set formed from a plurality of second phase difference detection pixels that are disposed on the second line, so as to determine distortion amounts due to the rolling shutter;
    a correcting section that corrects results of a correlation computation obtained by the first correlation computing section, by subtracting results of a correlation computation obtained by the second correlation computing section from the results of the correlation computation obtained by the first correlation computing section; and
    a focusing section that carries out focus control by using the results of correlation computation that have been corrected.

2. The imaging device of claim 1, wherein:
    the second correlation computing section carries out correlation computation on a plurality of sets, and
    the correcting section corrects the results of correlation computation obtained by the first correlation computing section, using an average value of results of correlation computation of a plurality of sets obtained by the second correlation computing section.

3. The imaging device of claim 1, wherein, in a case in which the second correlation computing section carries out correlation computation on signals read out from a set that is configured by four or more phase difference detection pixels, the second correlation computing section divides the four or more phase difference detection pixels into two groups, and carries out correlation computation on an addition signal that is obtained by adding detection signals of one group, and an addition signal that is obtained by adding detection signals of another group.

4. The imaging device of claim 1, further comprising:
    a comparing section that, in a case in which results of correlation computation of each of a plurality of sets is obtained by the second correlation computing section, compares the results of correlation computation of each of the plurality of sets with one another; and
    a control section that, in a case in which results of correlation computation that differ by greater than or equal to a predetermined threshold value exist according to the comparing section, controls such that focus control is cancelled, or controls such that, after cancelling of focus control, read out by the reading section is carried out again and focus control is carried out.

5. The imaging device of claim 1, wherein the second correlation computing section carries out correlation computation on signals that are read out from a set of phase difference detection pixels at which are provided color filters of a same color as a color of color filters that are provided at phase difference detection pixels of a set formed from the first phase difference detection pixel and the second phase difference detection pixel.

6. The imaging device of claim 1, wherein the second correlation computing section carries out correlation computation on signals that are read out from a set that includes a set of phase difference detection pixels at which are provided color filters of a color different than a color of color filters that are provided at phase difference detection pixels of a set formed from the first phase difference detection pixel and the second phase difference detection pixel.

7. The imaging device of claim 1, further comprising:
a determining section that determines whether or not correction by the correcting section is to be carried out, on the basis of at least one of a size of a focal point region in which a focal point is adjusted, a number of phase difference detection pixels from which are read out signals that are used in correlation computation by the first correlation computing section, movement of an imaged subject within an imaging angle of view, and movement of an imaged subject within the focal point region,
wherein, in a case in which it is determined by the determining section that correction by the correcting section is not to be carried out, the focusing section cancels execution of correction by the correcting section, and carries out focus control by using results of correlation computation of the first correlation computing section before being corrected.

8. A focus control method that is carried out at an imaging device having an imaging element in which a plurality of first lines, at which are arrayed first phase difference detection pixels on which is incident a light beam that has passed through one side with respect to a main axis of an imaging lens, and a plurality of second lines, at which are arrayed second phase difference detection pixels on which is incident a light beam that has passed through another side with respect to the main axis of the imaging lens, are arrayed alternately, the method comprising:
a reading out step of reading out, from the imaging element and by a rolling shutter method, signals of phase difference detection pixels that are arrayed at the imaging element;
a first correlation computing step of carrying out correlation computation on signals that are read out from a set formed from the first phase difference detection pixel and the second phase difference detection pixel, so as to determine phase difference amounts;
a second correlation computing step of carrying out correlation computation on signals that are read out from at least one set of a set formed from a plurality of first phase difference detection pixels that are disposed on the first line, or a set formed from a plurality of second phase difference detection pixels that are disposed on the second line, so as to determine distortion amounts due to the rolling shutter;
a correcting section for correcting results of the first correlation computation obtained by the first correlation computing step, by subtracting results of correlation computation obtained by the second correlation computing step from the results of the correlation computation obtained by the first computer step; and
a focusing step of carrying out focus control by using the results of correlation computation that have been corrected.

* * * * *